US011999436B2

(12) United States Patent
Ohno

(10) Patent No.: US 11,999,436 B2
(45) Date of Patent: Jun. 4, 2024

(54) LEANING VEHICLE

(71) Applicant: YAMAHA HATSUDOKI KABUSHIKI KAISHA, Iwata (JP)

(72) Inventor: Kohsuke Ohno, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 17/679,932

(22) Filed: Feb. 24, 2022

(65) Prior Publication Data

US 2022/0274665 A1   Sep. 1, 2022

Related U.S. Application Data

(63) Continuation-in-part of application No. PCT/JP2020/032675, filed on Aug. 28, 2020.

(30) Foreign Application Priority Data

Aug. 30, 2019  (JP) ................................. 2019-158745

(51) Int. Cl.
  *B62K 5/10*       (2013.01)
  *B62K 11/04*      (2006.01)
(52) U.S. Cl.
  CPC ................ *B62K 5/10* (2013.01); *B62K 11/04* (2013.01)
(58) Field of Classification Search
  CPC .............................. B62K 5/10; B60G 2300/45
  See application file for complete search history.

(56) References Cited

U.S. PATENT DOCUMENTS 6,015,022 A   1/2000 Thuliez
7,530,419 B2* 5/2009 Brudeli .................. B62K 5/027
                                           280/124.109
(Continued)

FOREIGN PATENT DOCUMENTS

CN   101698420 A   4/2010
CN   109693745 A   4/2019
(Continued)

OTHER PUBLICATIONS

MWC-4, Yamaha Motor Co., Ltd. [online], 2017, [retrieval date Oct. 7, 2020], Internet URL: https://global.yamaha-motor.com/about/design/concept/mwc4/, entire text, all drawings.
(Continued)

Primary Examiner — Amy R Weisberg
Assistant Examiner — Tiffany L Webb
(74) Attorney, Agent, or Firm — Rabin & Berdo, P.C.

(57) ABSTRACT

A leaning vehicle including a vehicle body frame having a main framework part, a seat, left and right steps, left and right front wheels, at least one rear wheel, a leaning linkage mechanism including left and right swing arms swingably supporting the left and right front wheels and connected to the vehicle body frame via left and right support parts, respectively, and a buffer device buffering movement of the left and right front wheels. The leaning vehicle leans the vehicle body frame leftward and rightward when turning left and right, respectively. The main framework part includes a main-framework-front portion that is located further forward than centers of the left and right steps, that is wider than a distance between the left and right support parts, and that supports the leaning linkage mechanism at a position further downward than at least a part of the left and right steps.

13 Claims, 8 Drawing Sheets

(56) References Cited

U.S. PATENT DOCUMENTS

| | | | |
|---|---|---|---|
| 7,568,541 B2* | 8/2009 | Pfeil | B62K 5/10 |
| | | | 280/5.509 |
| 8,123,240 B2* | 2/2012 | Mercier | B62K 5/10 |
| | | | 280/5.506 |
| 8,583,325 B2* | 11/2013 | Carabelli | B62K 5/10 |
| | | | 701/38 |
| 8,641,064 B2* | 2/2014 | Krajekian | B60G 3/20 |
| | | | 280/5.509 |
| 8,662,228 B2 | 3/2014 | Hill | |
| 9,428,235 B2 | 8/2016 | Takano et al. | |
| 9,434,439 B2 | 9/2016 | Iizuka et al. | |
| 9,452,803 B2 | 9/2016 | Sasaki et al. | |
| 9,493,208 B2* | 11/2016 | Sasaki | B62K 5/027 |
| 9,527,543 B2* | 12/2016 | Mercier | B60G 3/20 |
| 9,630,675 B2 | 4/2017 | Sasaki et al. | |
| 9,688,339 B2 | 6/2017 | Hirayama | |
| 9,771,117 B2 | 9/2017 | Hirakawa et al. | |
| 9,828,056 B2 | 11/2017 | Hirayama | |
| 10,077,091 B2* | 9/2018 | Mercier | B62K 5/08 |
| 10,160,506 B2 | 12/2018 | Yokoyama | |
| 10,427,745 B2* | 10/2019 | Raffaelli | B62D 9/02 |
| 10,583,885 B2* | 3/2020 | Raffaelli | B62D 9/02 |
| 10,737,720 B2* | 8/2020 | Kanehara | B62D 9/02 |
| 10,967,929 B2 | 4/2021 | Brudeli | |
| 10,994,796 B2* | 5/2021 | Kanehara | B62K 5/01 |
| 11,046,305 B2* | 6/2021 | Mizutani | B60W 30/04 |
| 11,198,483 B2* | 12/2021 | Hara | B62K 5/05 |
| 11,358,671 B2* | 6/2022 | Shibuya | B62K 5/05 |
| 11,505,026 B2 | 11/2022 | Di Tanna et al. | |
| 2004/0035625 A1 | 2/2004 | Talbot | |
| 2006/0255550 A1 | 11/2006 | Pfeil et al. | |
| 2007/0176384 A1* | 8/2007 | Brudeli | B60G 21/007 |
| | | | 280/124.103 |
| 2008/0258415 A1* | 10/2008 | Melcher | B62K 5/10 |
| | | | 280/124.103 |
| 2011/0006498 A1 | 1/2011 | Mercier | |
| 2012/0267870 A1 | 10/2012 | Mercier | |
| 2016/0229249 A1 | 8/2016 | Mori et al. | |
| 2017/0008591 A1 | 1/2017 | Abbott et al. | |

FOREIGN PATENT DOCUMENTS

| | | |
|---|---|---|
| DE | 212014000042 U1 | 10/2015 |
| EP | 3360764 A1 | 8/2018 |
| EP | 3375700 A1 | 9/2018 |
| EP | 3381778 A1 | 10/2018 |
| EP | 3428048 A1 | 1/2019 |
| JP | S538941 A | 1/1978 |
| JP | S53104938 A | 9/1978 |
| JP | H07-277248 A | 10/1995 |
| JP | H10-309988 A | 11/1998 |
| JP | H11-115858 A | 4/1999 |
| JP | H11310178 A | 11/1999 |
| JP | H11514948 A | 12/1999 |
| JP | 2002-211464 A | 7/2002 |
| JP | 2007-111380 A | 5/2007 |
| JP | 2009-083652 A | 4/2009 |
| JP | 2011110940 A | 6/2011 |
| JP | 2013071547 A | 4/2013 |
| JP | 2017-047752 A | 3/2017 |
| JP | 1595205 S | 1/2018 |
| WO | 2005002957 A1 | 1/2005 |
| WO | 2014/145878 A1 | 9/2014 |
| WO | 2014201463 A2 | 12/2014 |
| WO | 2015/002170 A1 | 1/2015 |
| WO | 2017/082424 A1 | 5/2017 |
| WO | 2017/086350 A1 | 5/2017 |
| WO | 2017/194686 A1 | 11/2017 |
| WO | 2019/044471 A1 | 3/2019 |

OTHER PUBLICATIONS

"Yamaha MWC-4", Yamaha Motor Co., Ltd. [searched on Jul. 30, 2019], Internet URL: https://global.yamaha-motor.com/jp/profile/design/concept/mwc4/.

European Office Action dated Jun. 9, 2023, in the counterpart European Patent Application No. 20859509.0.

Piaggioo MP3 LT 500 Owner's Manual, Ed. 03_02/2016; Piaggio &C. S.p.A. (Year: 2016).

Yamaha Owner's Manual Tricity 125 Motorcycle, printed Dec. 2016 (Year: 2016).

* cited by examiner

LEANING VEHICLE

CROSS-REFERENCE TO RELATED APPLICATIONS

This is a continuation-in-part application of International Application PCT/JP2020/032675, filed on Aug. 28, 2020, which claims priority from Japanese Patent Application No. 2019-158745, filed on Aug. 30, 2019. The contents of the applications are incorporated herein by reference.

TECHNICAL FIELD

The present teaching relates to a leaning vehicle.

BACKGROUND ART

A known leaning vehicle is configured to lean leftward when turning to the left and lean rightward when turning to the right. As such a leaning vehicle, Patent Document 1, for example, discloses a three-wheeled leaning vehicle including a vehicle body frame, two front wheels, and a rear wheel. The two front wheels include a left front wheel and a right front wheel.

CITATION LIST

Patent Document

Patent Document 1: International Patent Application Publication No. 2019-044471

SUMMARY OF INVENTION

Technical Problem

A leaning vehicle is required of having enhanced design flexibility in, for example, a riding position of a driver and layout of parts mounted on a vehicle body frame.

An object of the present teaching is to provide a leaning vehicle capable of enhancing design flexibility in, for example, a riding position of a driver and layout of parts mounted on a vehicle body frame.

Solution to Problem

A leaning vehicle according to one embodiment of the present teaching is a leaning vehicle including: a vehicle body frame; a seat supported by the vehicle body frame and being configured such that a driver is seated on the seat; a left step and a right step supported by the vehicle body frame and being configured such that feet of the driver are placed on the left step and the right step; a left front wheel located at the left of the vehicle body frame; a right front wheel located at the right of the vehicle body frame; at least one rear wheel; a leaning linkage mechanism including a left swing arm and a right swing arm and configured to support the vehicle body frame, the left front wheel, and the right front wheel such that the vehicle body frame, the left front wheel, and the right front wheel lean leftward or rightward, the left swing arm swingably supporting the left front wheel to the vehicle body frame, the right swing arm swingably supporting the right front wheel to the vehicle body frame; and a buffer device configured to buffer movement of the left front wheel and the right front wheel. The leaning vehicle leans the vehicle body frame, the left front wheel, the right front wheel, and the rear wheel leftward when turning to the left, and leans the vehicle body frame, the left front wheel, the right front wheel, and the rear wheel rightward when turning to the right. The vehicle body frame includes a main framework part. The main framework part includes a main-framework-front portion located further forward than centers of the left step and the right step in a front-rear direction and extending linearly in the front-rear direction. The main-framework-front portion has a dimension in a vehicle width direction larger than a distance between a support part of the left swing arm to the vehicle body frame and a support part of the right swing arm to the vehicle body frame. The main-framework-front portion supports at least a part of the leaning linkage mechanism at a position further downward than an upper surface of at least a part of the left step and the right step, in a side view of the leaning vehicle.

As described above, the main-framework-front portion is configured such that the main-framework-front portion extends linearly in the front-rear direction, the dimension of the main-framework-front portion in a vehicle width direction is larger than the distance between the support part of the left swing arm to the vehicle body frame and the support part of the right swing arm to the vehicle body frame, and in a side view of the leaning vehicle, the main-framework-front portion supports at least a part of the leaning linkage mechanism at a position further downward than the upper surface of at least a part of the left step and the right step. Accordingly, flexibility in, for example, a riding position of a driver and layout of parts mounted on the vehicle body frame can be enhanced. Thus, the degree of design flexibility of the leaning vehicle can be increased.

In another aspect, the leaning vehicle according to the present teaching preferably has the following configuration. The main framework part is located between the left step and the right step in plan view.

As described above, since the main framework part is located between the left step and the right step in plan view, flexibility in, for example, a riding position of a driver and layout of parts mounted on the vehicle body frame can be enhanced. Thus, the degree of design flexibility of the leaning vehicle can be increased.

In another aspect, the leaning vehicle according to the present teaching preferably has the following configuration. The main framework part extends linearly in the front-rear direction between legs of the driver in a state where the driver is seated on the seat and feet of the driver are placed on the left step and the right step.

As described above, the main framework part has a small width and linearly extends in the front-rear direction. Accordingly, flexibility in, for example, a riding position of a driver and layout of parts mounted on the vehicle body frame can be enhanced. Thus, the degree of design flexibility of the leaning vehicle can be increased.

In another aspect, the leaning vehicle according to the present teaching preferably has the following configuration. The main framework part extends linearly in the front-rear direction at a position further downward than the upper surfaces of the left step and the right step on which the driver seated on the seat places the feet in a side view of the leaning vehicle.

As described above, since the main framework part is configured to extend linearly in the front-rear direction at a position further downward than the upper surfaces of the left step and the right step on which a driver seated on the seat places the feet in a side view of the leaning vehicle, flexibility in, for example, a riding of the driver and layout of parts mounted on the vehicle body frame can be enhanced. Thus, the degree of design flexibility of the leaning vehicle can be increased.

In another aspect, the leaning vehicle according to the present teaching preferably has the following configuration. In the main framework part, the main-framework-front portion supports the leaning linkage mechanism, and a main-framework-rear portion located further rearward than centers of the left step and the right step in the front-rear direction supports the seat, the rear wheel, and the driving source.

In this configuration, in the main framework part of the vehicle body frame, the main-framework-front portion supports the leaning linkage mechanism supporting the vehicle body frame, the left front wheel, and the right front wheel such that the vehicle body frame, the left front wheel, and the right front wheel lean leftward or rightward, and the main-framework-rear portion supports the other mounted parts. Accordingly, flexibility in, for example, a riding position of a driver and layout of parts mounted on the vehicle body frame can be enhanced. Thus, the degree of design flexibility of the leaning vehicle can be increased.

In another aspect, the leaning vehicle according to the present teaching preferably has the following configuration. The leaning vehicle further includes a steering handle configured to rotate about a steering axis by operation of the driver. The vehicle body frame includes a handlebar support part rotatably supporting the steering handle. The handlebar support part is constituted by a member different from the main framework part, and extends upward from an upper portion of the main framework part.

In this configuration, since the handlebar support part constituted by a member different from the main framework part and rotatably supporting the steering handle extends upward from the upper portion of the main framework part having a small width and formed linearly, flexibility in, for example, a riding position of a driver and layout of parts mounted on the vehicle body frame can be enhanced. Thus, the degree of design flexibility of the leaning vehicle can be increased.

In another aspect, the leaning vehicle according to the present teaching preferably has the following configuration. At least a part of the handlebar support part extends upward from an upper portion of the main-framework-front portion.

With this configuration, since the handlebar support part extends upward from the upper portion of the main framework part having a small width and formed linearly, flexibility in, for example, a riding position of a driver and layout of parts mounted on the vehicle body frame can be enhanced. Thus, the degree of design flexibility of the leaning vehicle can be increased.

In another aspect, the leaning vehicle according to the present teaching preferably has the following configuration. An upper end of the main-framework-front portion is lower than a lower end of the steering handle.

With this configuration, since the upper end of the main-framework-front portion in the main framework part having a small width and formed linearly is lower than the lower end of the steering handle, flexibility in, for example, a riding position of a driver and layout of parts mounted on the vehicle body frame can be enhanced. Thus, the degree of design flexibility of the leaning vehicle can be increased.

In another aspect, the leaning vehicle according to the present teaching preferably has the following configuration. The leaning linkage mechanism is configured to be detachable from the main framework part and the handlebar support part.

With this configuration, since the leaning linkage mechanism is configured to be detachable from the main framework part and the handlebar support part, flexibility in, for example, a riding position of a driver and layout of parts mounted on the vehicle body frame can be enhanced. Thus, the degree of design flexibility of the leaning vehicle can be increased.

In another aspect, the leaning vehicle according to the present teaching preferably has the following configuration. The upper end of the main-framework-front portion is lower than a seat surface of the seat.

With this configuration, since the upper end of the main-framework-front portion in the main framework part having a small width and formed linearly is lower than the seat surface of the seat, flexibility in, for example, a riding position of a driver and layout of parts mounted on the vehicle body frame can be enhanced. Thus, the degree of design flexibility of the leaning vehicle can be increased.

In another aspect, the leaning vehicle according to the present teaching preferably has the following configuration. The upper end of the main-framework-front portion is lower than an upper end of the leaning linkage mechanism.

With this configuration, since the upper end of the main-framework-front portion in the main framework part having a small width and formed linearly is lower than the upper end of the leaning linkage mechanism, flexibility in, for example, a riding position of a driver and layout of parts mounted on the vehicle body frame can be enhanced. Thus, the degree of design flexibility of the leaning vehicle can be increased.

In another aspect, the leaning vehicle according to the present teaching preferably has the following configuration. An upper end of the handlebar support part is higher than the seat surface of the seat.

With this configuration, since the upper end of the handlebar support part is higher than the seat surface of the seat, flexibility in, for example, a riding position of a driver and layout of parts mounted on the vehicle body frame can be enhanced. Thus, the degree of design flexibility of the leaning vehicle can be increased.

In another aspect, the leaning vehicle according to the present teaching preferably has the following configuration. A track width between the left front wheel and the right front wheel is larger than a distance between a left end of the left step and a right end of the right step.

With this configuration, since the track width between the left front wheel and the right front wheel is larger than the distance between the left end of the left step and the right end of the right step, flexibility in, for example, a riding position of a driver and layout of parts mounted on the vehicle body frame can be enhanced. Thus, the degree of design flexibility of the leaning vehicle can be increased.

In another aspect, the leaning vehicle according to the present teaching preferably has the following configuration. The left step has a recess on which a left foot of the driver seated on the seat is placed.

This configuration can prevent the left step from interfering with the left foot of a driver when the driver lands the left foot. In addition, since the left step has the recess, in the configuration in which the driver can land the left foot without interference with the left step, flexibility in, for example, a riding of the driver and layout of parts mounted on the vehicle body frame can be enhanced. Thus, the degree of design flexibility of the leaning vehicle can be increased.

The terminology used herein is for the purpose of describing particular embodiments only and is not intended to be limiting of the invention.

As used herein, the term "and/or" includes any and all combinations of one or more of the associated listed items.

It will be further understood that the terms "including," "comprising" or "having" and variations thereof when used in this specification, specify the presence of stated features, steps, elements, components, and/or their equivalents but do not preclude the presence or addition of one or more steps, operations, elements, components, and/or groups thereof.

It will be further understood that the terms "mounted," "connected," "coupled," and/or their equivalents are used broadly and encompass both direct and indirect mounting, connecting and coupling. Further, "connected" and "coupled" are not restricted to physical or mechanical connections or couplings, and can include connections or couplings, whether direct or indirect.

Unless otherwise defined, all terms (including technical and scientific terms) used herein have the same meaning as commonly understood by one having ordinary skill in the art to which this invention belongs.

It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Embodiments of a leaning vehicle according to the present teaching will be described.

In the following description, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

[Leaning Vehicle]

A leaning vehicle herein is a vehicle that turns in a leaning posture. Specifically, the leaning vehicle is a vehicle that leans leftward when turning to the left and leans rightward when turning to the right in a left-right direction of the vehicle. The leaning vehicle may be a single-passenger vehicle or a vehicle on which a plurality of passengers can ride. The leaning vehicle includes all the types of vehicles that turn in leaning postures, such as three-wheeled vehicles and four-wheeled vehicles.

[Main Framework Part Extends Linearly]

The term "the main framework part extends linearly" herein refers to not only a case where the main framework part extends linearly in the front-rear direction but also a case where the main framework part extends obliquely leftward or rightward or upward or downward with respect to the front-rear direction of the leaning vehicle and a case where the direction of extension of the main framework part is shifted stepwise leftward or rightward or upward or downward with respect to the front-rear direction. The term "the main framework part extends linearly" also refers to a case where a part of the main framework part has a projection projecting in the left-right direction of the leaning vehicle or a recess recessed in the left-right direction of the leaning vehicle.

[Left End of Left Step, Right End of Right Step]

The left end of the left step herein refers to a portion of the left step located at the leftmost end in the left-right direction of the leaning vehicle. The right end of the right step herein refers to a portion of the right step located at the rightmost end in the left-right direction of the leaning vehicle.

[Track Width Between Left Front Wheel and Right Front Wheel]

The track width between the left front wheel and the right front wheel herein refers to a distance between the center of the left front wheel and the center of the right front wheel in the left-right direction of the leaning vehicle.

Advantageous Effects of Invention

According to one embodiment of the present teaching, it is possible to provide a leaning vehicle capable of enhancing design flexibility in, for example, a riding position of a driver and layout of parts mounted on a vehicle body frame.

DESCRIPTION OF EMBODIMENT

Figure 1:
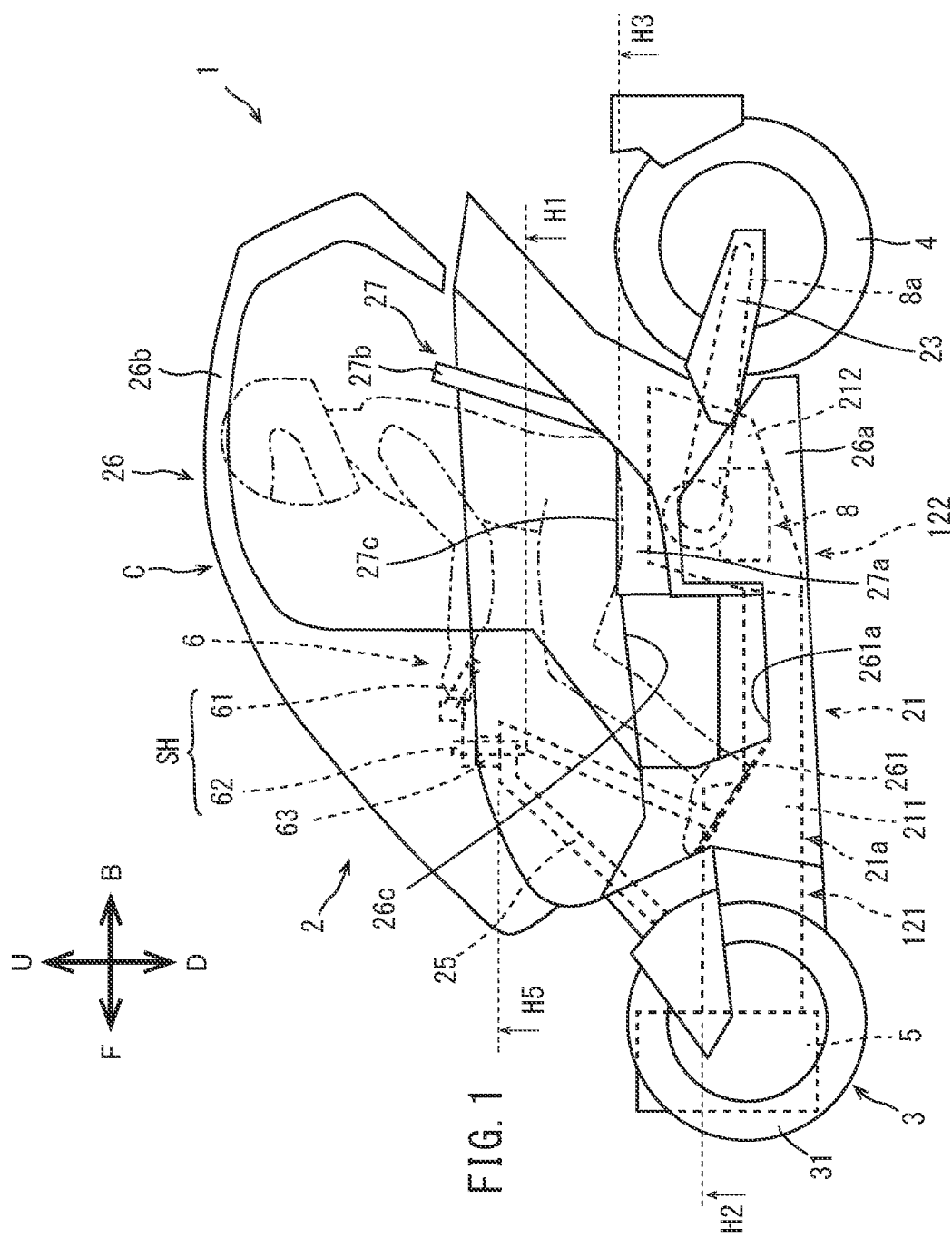
FIG. 1 is a left side view schematically illustrating an overall configuration of a leaning vehicle according to a first embodiment.

Embodiments will be described hereinafter with reference to the drawings. In the drawings, the same or corresponding parts are denoted by the same reference numerals, and description thereof will not be repeated. The dimensions of components in the drawings do not strictly represent actual dimensions of the components and dimensional proportions of the components.

In the following description, arrow F in the drawings represents a forward direction of a leaning vehicle 1, 1001.

Arrow B in the drawings represents a rearward direction of the leaning vehicle 1, 1001. Arrow U in the drawings represents an upward direction of the leaning vehicle 1, 1001. Arrow D in the drawings represents a downward direction of the leaning vehicle 1, 1001. Arrow R in the drawings represents a rightward direction of the leaning vehicle 1, 1001. Arrow L in the drawings represents a leftward direction of the leaning vehicle 1, 1001. A front-rear direction, a left-right direction, and a top-bottom direction of the leaning vehicle 1, 1001 refer to a front-rear direction, a left-right direction, and a top-bottom direction, respectively, with respect to the leaning vehicle 1, 1001 when seen from a driver of the leaning vehicle 1, 1001.

Figure 5:
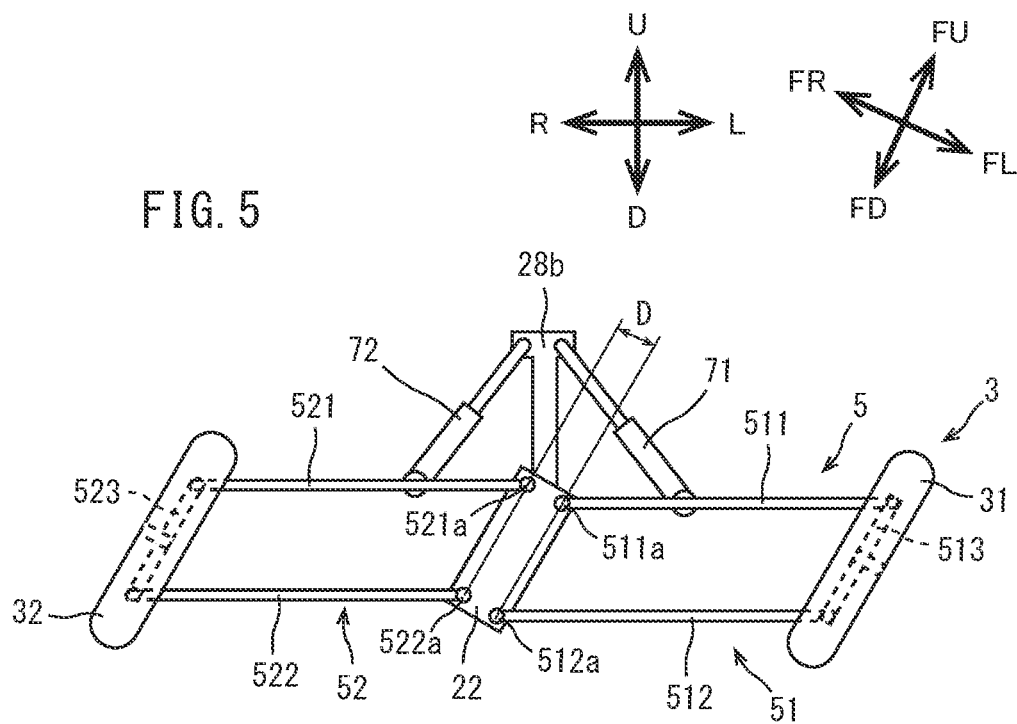
FIG. 5 is a schematic view of a leaning linkage mechanism with the vehicle body frame leaning leftward when the leaning linkage mechanism is seen toward the rear.
Figure 6:
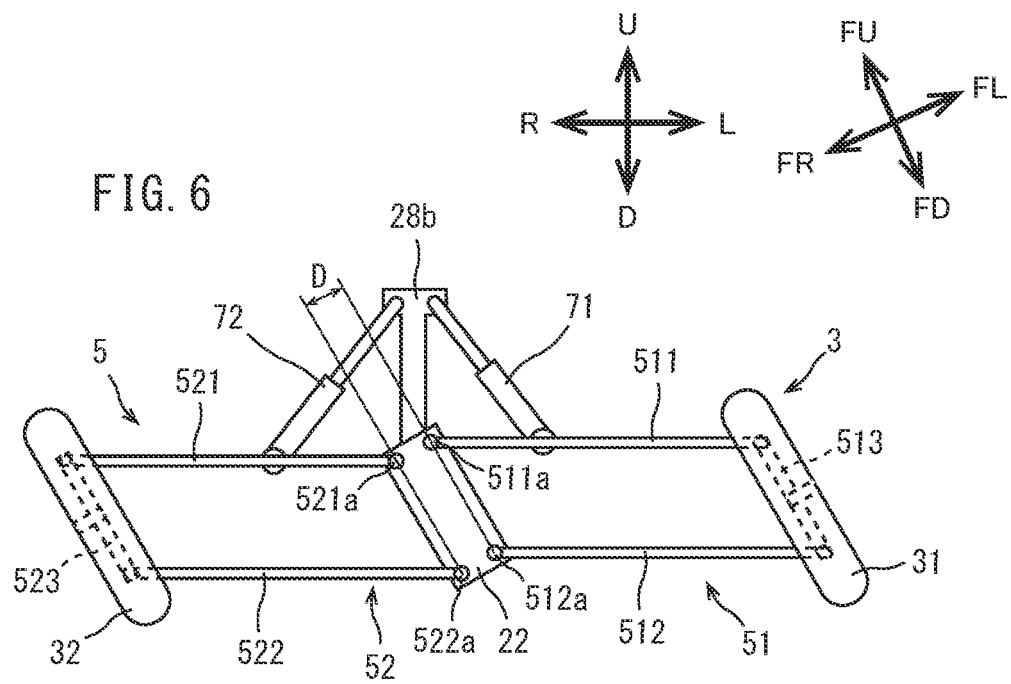
FIG. 6 is a schematic view of the leaning linkage mechanism with the vehicle body frame leaning rightward when the leaning linkage mechanism is seen toward the rear.

The leaning vehicle 1, 1001 according to each embodiment turns with a vehicle body frame 21, 1021 leaning leftward or rightward with respect to the vertical direction. Thus, in FIGS. 5 and 6 illustrating a state where the vehicle body frame 21 leans, in addition to the directions with respect to the leaning vehicle 1 described above, directions with respect to the vehicle body frame 21 are defined as follows.

Arrow FU in the drawings represents an upward direction of the vehicle body frame 21. Arrow FD in the drawings represents a downward direction of the vehicle body frame 21. Arrow FR in the drawings represents a rightward direction of the vehicle body frame 21. Arrow FL in the drawings represents a leftward direction of the vehicle body frame 21. A left-right direction and a top-bottom direction of the vehicle body frame 21 refer to a left-right direction and a top-bottom direction, respectively, with respect to the vehicle body frame 21 when seen from a passenger driving the leaning vehicle 1.

First Embodiment

Overall Configuration

Figure 2:
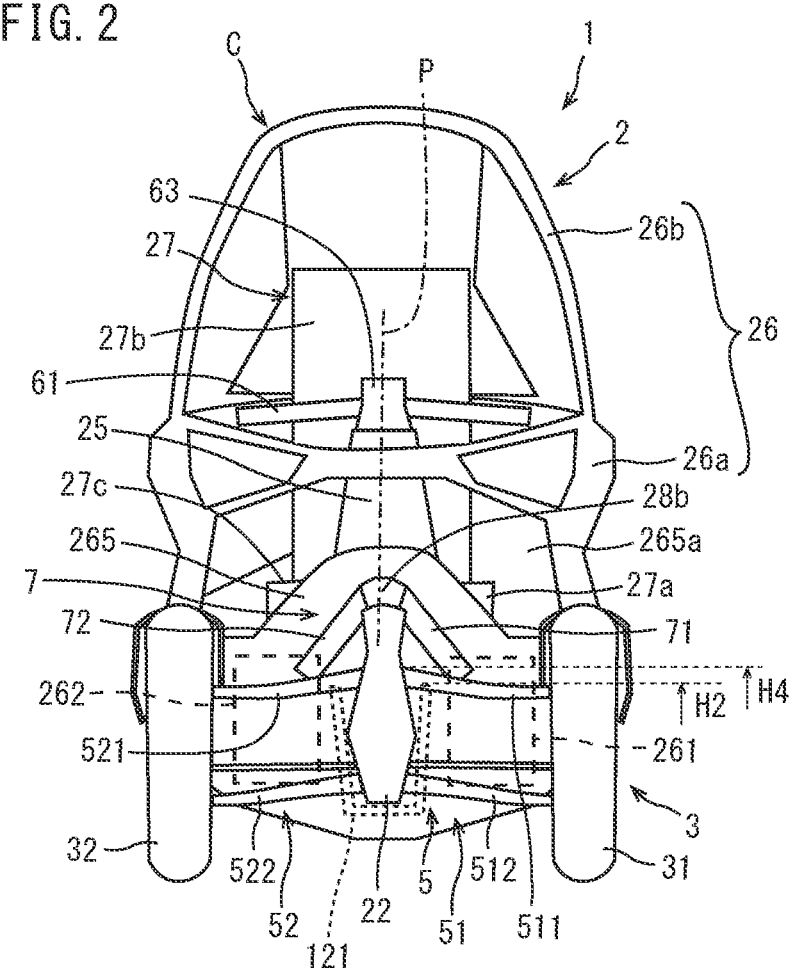
FIG. 2 is a front view schematically illustrating the overall configuration of the leaning vehicle according to the first embodiment.

FIG. 1 is a left side view schematically illustrating an overall configuration of a leaning vehicle 1 according to a first embodiment. FIG. 2 is a front view schematically illustrating the overall configuration of the leaning vehicle 1. The leaning vehicle 1 includes a vehicle main body 2, a pair of left and right front wheels 3, a rear wheel 4, a leaning linkage mechanism 5, a steering mechanism 6, a buffer device 7, and a power unit 8 (driving source).

The leaning vehicle 1 according to this embodiment is a vehicle that leans leftward when turning to the left and leans rightward when turning to the right. That is, the leaning vehicle 1 according to this embodiment is a vehicle in which the vehicle main body 2 and the pair of left and right front wheels 3 lean leftward when turning to the left and the vehicle main body 2 and the pair of left and right front wheels 3 lean rightward when turning to the right.

As illustrated in FIGS. 1 and 2, the vehicle main body 2 includes the vehicle body frame 21, a rear arm 23, a vehicle body cover 26, and a seat 27. In FIGS. 1 and 2, the vehicle body frame 21 is in an upright state. In the case of referring to FIGS. 1 and 2, the following description is based on a premise that the vehicle body frame 21 is in the upright state. The upright state of the vehicle body frame 21 refers to a state where the top-bottom direction of the vehicle body frame 21 coincides with the vertical direction.

As illustrated in FIG. 1, the vehicle body frame 21 supports mounted parts mounted on the leaning vehicle 1, such as the vehicle body cover 26, the seat 27, and the power unit 8. Specifically, a front portion of the vehicle body frame 21 supports the leaning linkage mechanism 5. A rear portion of the vehicle body frame 21 supports a rear-arm-support part 24, the seat 27, and the power unit 8.

The power unit 8 includes a motor as a driving-force-generating source, for example. The power unit 8 may include an engine or may have a hybrid system including a combination of an engine and a motor, as the driving-force-generating source.

A driving force output from the power unit 8 is transferred to the rear wheel 4 by a driving-force-transfer part 8a. The driving-force-transfer part 8a is supported by the rear arm 23 described later rotatably supporting the rear wheel 4. The driving-force-transfer part 8a includes, for example, a chain.

Figure 3:
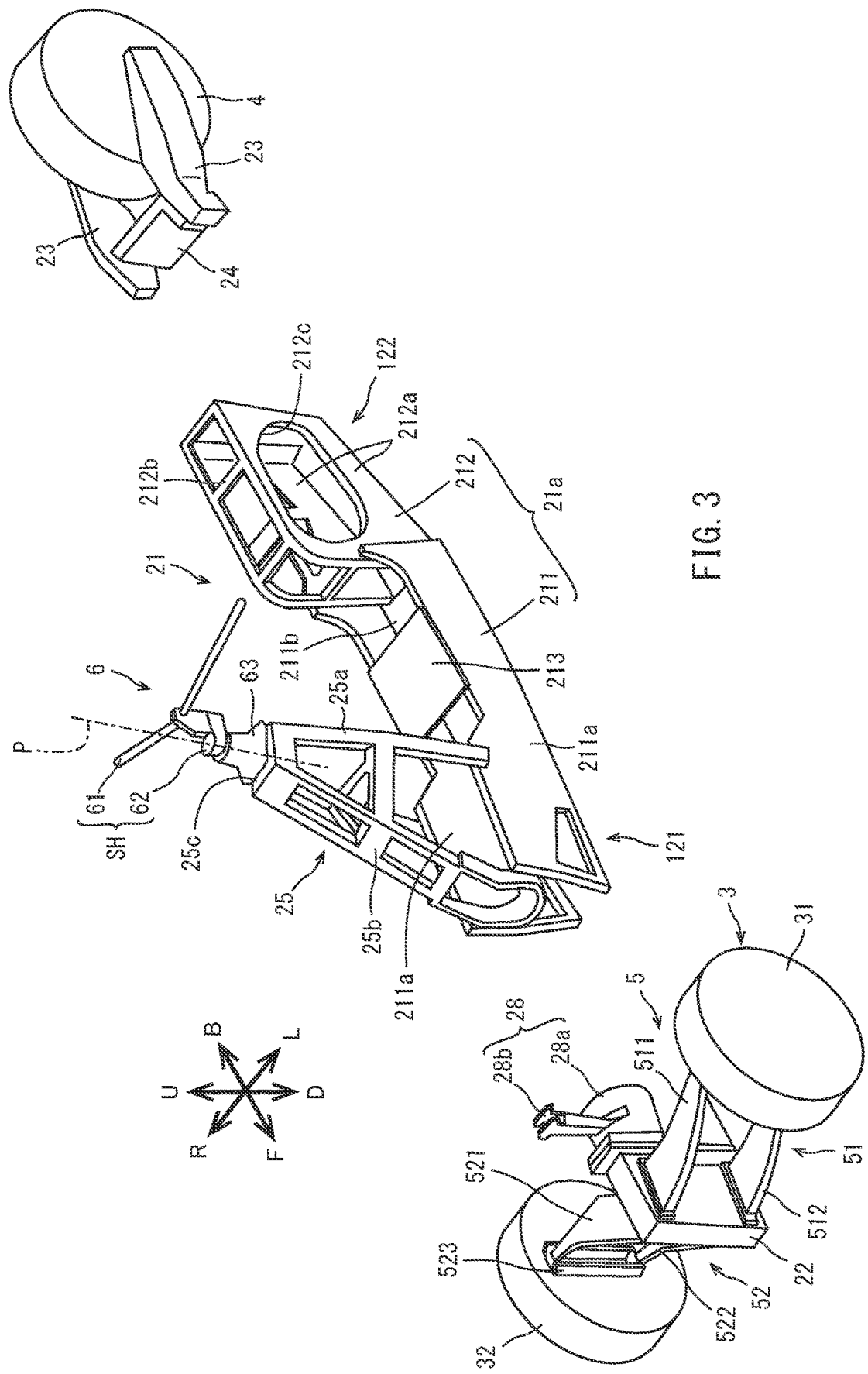
FIG. 3 is a disassembled perspective view illustrating a schematic configuration of a vehicle body frame.

FIG. 3 is a disassembled perspective view illustrating a schematic configuration of the vehicle body frame 21, the pair of left and right front wheels 3, the rear wheel 4, the leaning linkage mechanism 5, and the steering mechanism 6. As illustrated in FIG. 3, the vehicle body frame 21 includes a main framework part 21a, a leaning-linkage-mechanism-support part 22, the rear-arm-support part 24, and a handlebar support part 25.

The main framework part 21a is a frame constituting a framework of the vehicle main body 2 of the leaning vehicle 1. Although a detailed configuration of the main framework part 21a will be described later, the main framework part 21a includes a front framework part 211 and a rear framework part 212. The front framework part 211 is located forward of the rear framework part 212 in the main framework part 21a. The rear framework part 212 is located rearward of the front framework part 211 in the main framework part 21a. The front framework part 211 and the rear framework part 212 are aligned in the front-rear direction and are coupled to each other.

A front portion of the front framework part 211 supports the leaning-linkage-mechanism-support part 22. A front portion of the rear framework part 212 supports the power unit 8 and the seat 27, and a rear portion of the rear framework part 212 supports the rear-arm-support part 24.

As illustrated in FIG. 1, the seat 27 is supported by the rear framework part 212 of the vehicle body frame 21. The seat 27 includes a seat portion 27a and a seat back 27b. Although not specifically illustrated, the seat portion 27a of the seat 27 is supported by an upper portion of the rear framework part 212. The upper surface of the seat portion 27a is a seat surface 27c on which the driver is seated.

As illustrated in FIG. 3, the leaning-linkage-mechanism-support part 22 is connected to the front end of the front framework part 211. The leaning-linkage-mechanism-support part 22 supports the leaning linkage mechanism 5 described later. The leaning linkage mechanism 5 supports the pair of left and right front wheels 3. That is, the leaning-linkage-mechanism-support part 22 supports the pair of left and right front wheels 3 through the leaning linkage mechanism 5. A detailed configuration of the leaning linkage mechanism 5 will be described later. The leaning-linkage-mechanism-support part 22 is detachable from the front framework part 211. Accordingly, the leaning linkage mechanism 5 supported by the leaning-linkage-mechanism-support part 22 is also detachable from the main framework part 21a. The leaning-linkage-mechanism-support part 22 is also detachable from the handlebar support part 25 described later connected to the main framework part 21a.

As illustrated in FIGS. 2 and 3, the pair of left and right front wheels 3 includes a left front wheel 31 located at the left of the vehicle body frame 21 and a right front wheel 32 located at the right of the vehicle body frame 21. A left arm mechanism 51 of the leaning linkage mechanism 5 described later extends leftward from the leaning-linkage-mechanismsupport part 22 to support the left front wheel 31 to the vehicle body frame 21. A right arm mechanism 52 of the leaning linkage mechanism 5 described later extends rightward from the leaning-linkage-mechanism-support part 22 to support the right front wheel 32 to the vehicle body frame 21.

As illustrated in FIG. 3, a buffer-device-support part 28 supporting the buffer device 7 is disposed between the leaning-linkage-mechanism-support part 22 and the front framework part 211. The buffer-device-support part 28 is connected to an upper portion of the leaning-linkage-mechanism-support part 22 and a front lower end portion of the handlebar support part 25 connected to the front framework part 211.

The buffer-device-support part 28 includes a buffer-device-support-main-body portion 28a and a tower portion 28b. The buffer-device-support-main-body portion 28a is a cylindrical member and supports a proximal end portion of the tower portion 28b extending in the top-bottom direction. The buffer-device-support-main-body portion 28a is connected to the leaning-linkage-mechanism-support part 22 and the front lower end portion of the handlebar support part 25.

The buffer device 7 buffers movement of the left front wheel 31 and the right front wheel 32. As illustrated in FIG. 2, the buffer device 7 includes a left buffer device 71 and a right buffer device 72. The left buffer device 71 connects the tower portion 28b to a left-upper-arm member 511 of the leaning linkage mechanism 5 described later. The right buffer device 72 connects the tower portion 28b to a right-upper-arm member 521 of the leaning linkage mechanism 5 described later. Although not specifically illustrated, each of the left buffer device 71 and the right buffer device 72 includes a spring and a damper.

The left buffer device 71 buffers a force to be input to the left front wheel 31 from the road surface and positions the left front wheel 31 relative to the vehicle body frame 21. The right buffer device 72 buffers a force to be input to the right front wheel 32 from the road surface and positions the right front wheel 32 relative to the vehicle body frame 21.

As illustrated in FIG. 3, the handlebar support part 25 is connected to an upper portion of a front portion of the front framework part 211, and extends upward from an upper portion of the front framework part 211. Accordingly, it is possible to prevent the handlebar support part 25 from hindering getting on and off of a driver when the driver gets on and off the leaning vehicle 1. Thus, the driver can easily get on or off the leaning vehicle 1. As illustrated in FIG. 1, a height H5 of the upper end of the handlebar support part 25 is higher than the seat surface 27c of the seat 27. The upper end of the handlebar support part 25 is located at the highest position in the handlebar support part 25 in the top-bottom direction.

The handlebar support part 25 may partially extend upward from an upper portion of a portion of the main framework part 21a except the front framework part 211. That is, the handlebar support part 25 may be provided in any manner in the main framework part 21a as long as at least a portion of the handlebar support part 25 extends upward from the upper portion of the front framework part 211. In this embodiment, the handlebar support part 25 is constituted by a member different from the main framework part 21a.

The handlebar support part 25 may extend upward from an upper portion of a portion except the front framework part 211. That is, the handlebar support part 25 may extend upward from an upper portion of the main framework part 21a.

The handlebar support part 25 supports a bar handle 61 and a steering shaft 62 of the steering mechanism 6. The handlebar support part 25 has a height with which the bar handle 61 of the steering mechanism 6 is located at a position at which the driver seated on the seat surface 27c of the seat 27 can easily hold the bar handle 61.

The steering mechanism 6 includes the bar handle 61, the steering shaft 62, a steering-shaft-support part 63, and an unillustrated steering-force-transfer part. The bar handle 61 is a bar member extending in the left-right direction, and is connected to an upper end portion of the steering shaft 62. The steering shaft 62 is rotatably supported by the steering-shaft-support part 63 fixed to an upper portion of the handlebar support part 25, which will be described later. Although not specifically illustrated, the steering shaft 62 is connected to the steering-force-transfer part such that rotation of the bar handle 61 can be transferred to the steering-force-transfer part. The steering-force-transfer part transfers rotation of the steering shaft 62, as a steering force in the left direction or in the right direction, to the left front wheel 31 and the right front wheel 32. A detailed configuration of the steering-force-transfer part will be omitted.

The bar handle 61 and the steering shaft 62 constitute a steering handle SH. The steering shaft 62 is a portion supported by the steering-shaft-support part 63, and does not include other rotation shafts connected to the steering shaft 62 by transfer parts. The steering handle SH rotates about a steering axis P.

As illustrated in FIG. 3, the handlebar support part 25 according to this embodiment includes four handle-support-leg parts 25a, a plurality of handle-support-beam parts 25b, and a handle-support-top-panel part 25c. Each of the four handle-support-leg parts 25a and the plurality of handle-support-beam parts 25b is a plate-shaped bar member elongated in one direction. The handle-support-top-panel part 25c is a flat-plate member.

Upper end portions of the four handle-support-leg parts 25a are coupled to the handle-support-top-panel part 25c. The four handle-support-leg parts 25a are coupled to one another in the left-right direction by a part of the plurality of handle-support-beam parts 25b, and are coupled to each other in the front-rear direction by another part of the plurality of handle-support-beam parts 25b. In this embodiment, the four handle-support-leg parts 25a, the plurality of handle-support-beam parts 25b, and the handle-support-top-panel part 25c are integrally formed. Accordingly, the handlebar support part 25 is formed in a tower shape by the plate-shaped bar members.

Lower end portions of the four handle-support-leg parts 25a are fixed to the front framework part 211. The four handle-support-leg parts 25a may be fixed to the front framework part 211 in any manner as long as the handle-support-leg parts 25a can be fixed to the front framework part 211, such as welding, fastening using a fastening member, or bonding.

The steering-shaft-support part 63 of the steering mechanism 6 described later is fixed to the top of the handle-support-top-panel part 25c. The bar handle 61 is coupled to the steering shaft 62 rotatably supported by the steering-shaft-support part 63. The handlebar support part 25 supports the steering handle SH constituted by the bar handle 61 and the steering shaft 62.

The rear-arm-support part 24 is connected to the rear end of the rear framework part 212. The rear-arm-support part 24 rotatably supports front portions of the pair of left and right rear arms 23. Each of the pair of left and right rear arms 23 extends rearward from the rear-arm-support part 24. Rear portions of the pair of left and right rear arms 23 rotatably support the rear wheel 4.

The vehicle body cover 26 (cover) is supported by the vehicle body frame 21. As illustrated in FIGS. 1 and 2, the vehicle body cover 26 includes a vehicle-body-cover-main body 26a covering the vehicle body frame 21, and an upper cover 26b located above the vehicle-body-cover-main body 26a. The upper cover 26b has a convex shape projecting upward when seen in the left-right direction. Accordingly, the upper cover 26b constitutes a passenger space in which the driver rides, between the upper cover 26b and the vehicle-body-cover-main body 26a. Thus, the driver of the leaning vehicle 1 is not directly exposed to the weather so that comfort of the driver can be thereby enhanced. The upper cover 26b is located over the head of the driver seated on the seat surface 27c of the seat 27.

The vehicle-body-cover-main body 26a covers a right portion of the driver seated on the seat surface 27c of the seat 27, and leaves a left portion of the driver open. Accordingly, the driver is allowed to get on or off the leaning vehicle 1 from the left.

A right lower portion of the vehicle-body-cover-main body 26a has an opening 26c. The opening 26c is provided to allow the right foot of the driver seated on the seat surface 27c of the seat 27 to be placed on the ground through the opening 26c. That is, the leaning vehicle 1 includes the vehicle body cover 26 located at the right of the driver seated on the seat 27 to cover the right portion of the driver, and the vehicle body cover 26 has the opening 26c through which the right foot of the driver seated on the seat 27 is allowed to pass when the right foot of the driver is placed on the ground. As a result, convenience of the leaning vehicle 1 can be enhanced. In addition, with the configuration described above, the leaning vehicle 1 does not need to have a self-standing function, and thus, the configuration of the leaning vehicle 1 can be simplified.

Figure 4:
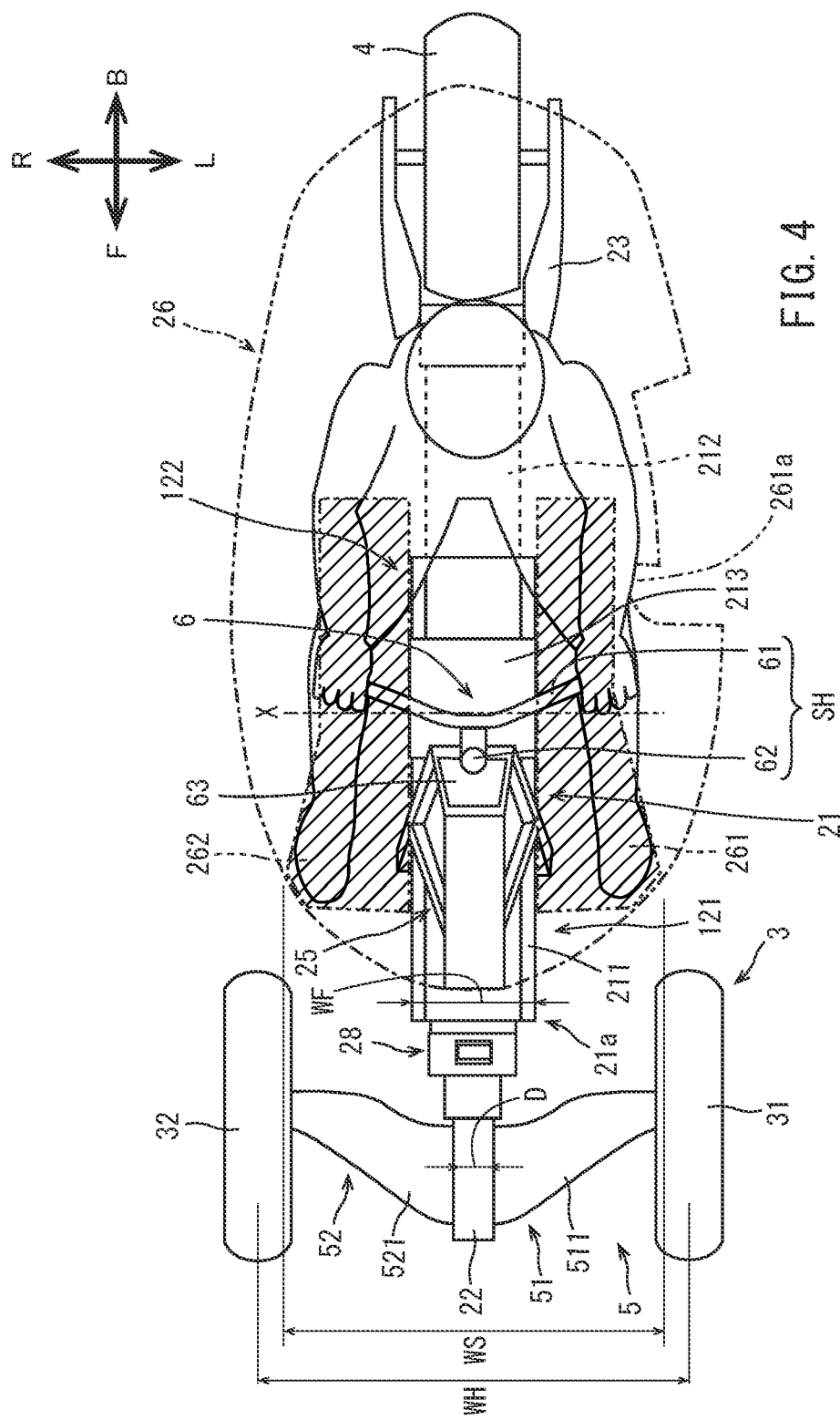
FIG. 4 is a plan view schematically illustrating a positional relationship among the vehicle body frame, a vehicle body cover, and a driver.

As illustrated in FIGS. 1 and 4, in a front lower portion of the vehicle-body-cover-main body 26a facing the passenger space, a plate-shaped left step 261 and a plate-shaped right step 262 are provided. The left step 261 is located in a left portion of the vehicle-body-cover-main body 26a, and the left foot of the driver seated on the seat surface 27c of the seat 27 is placed on the left step 261. A front portion of the left step 261 is inclined forward and upward. The right step 262 is located in a right portion of the vehicle-body-cover-main body 26a, and the right foot of the driver seated on the seat surface 27c of the seat 27 is placed on the right step 262. A front portion of the right step 262 is inclined forward and upward.

Figure 7:
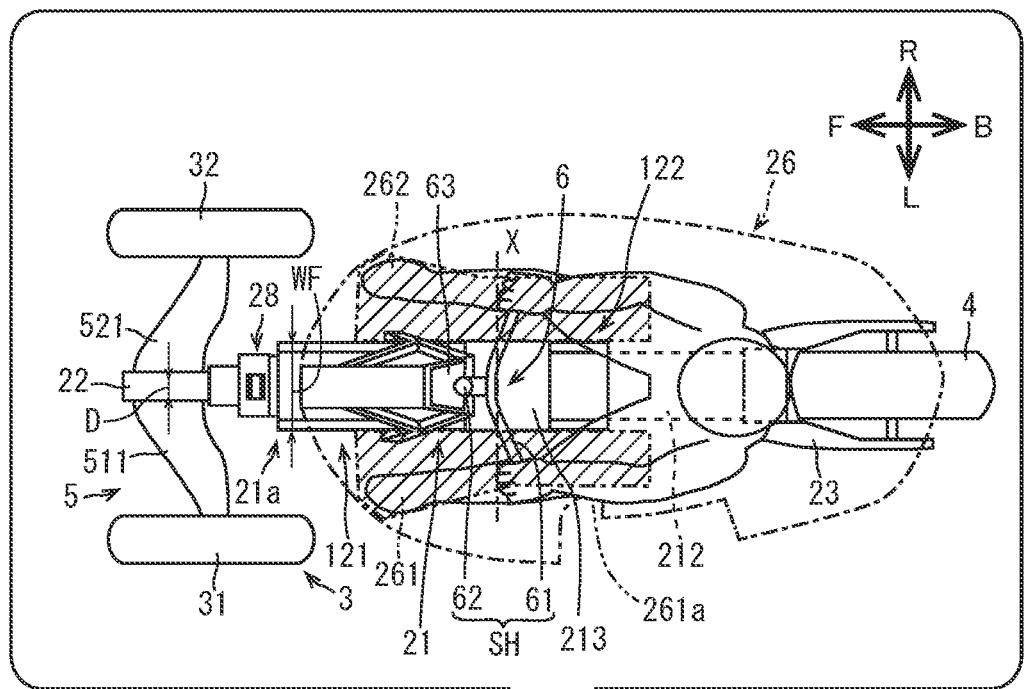
FIG. 7 shows the left side view of the leaning vehicle and the plan view schematically illustrating a positional relationship among the vehicle body frame, the vehicle body cover, and a driver.
Figure 7:
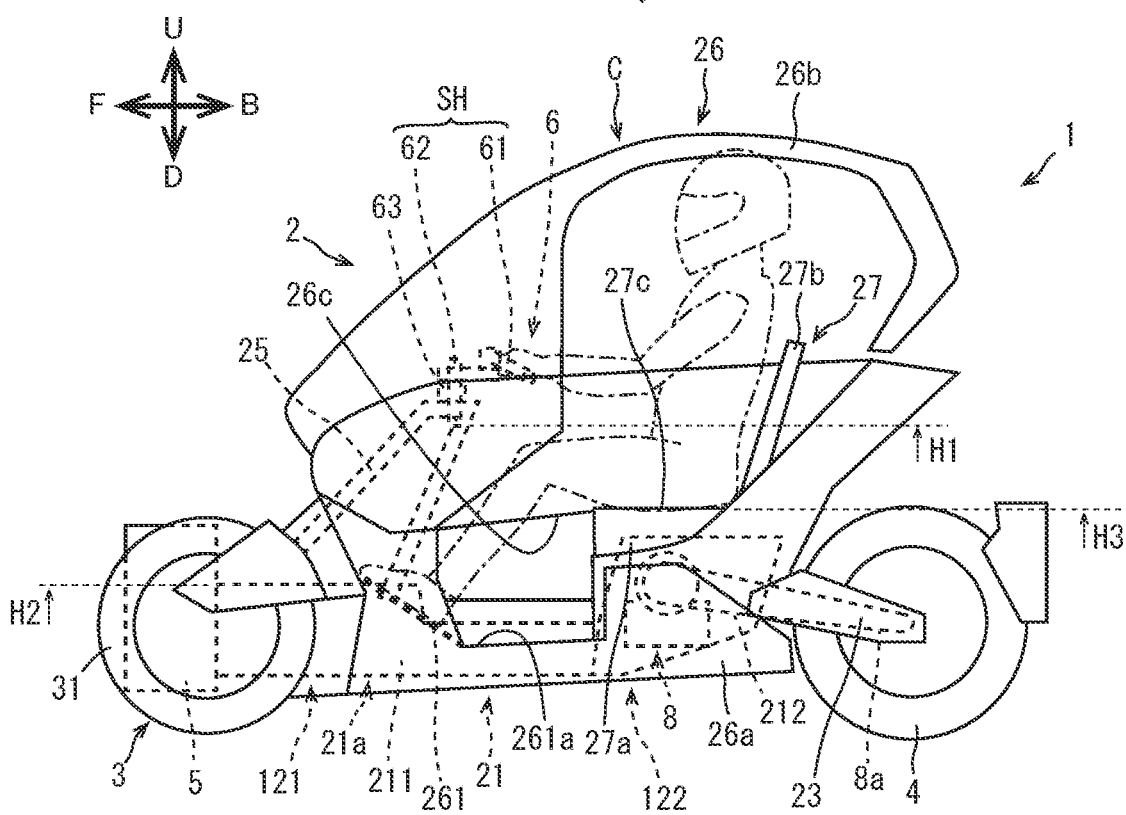

FIG. 4 is a plan view schematically illustrating a relationship among the driver, the vehicle body frame 21, and the vehicle body cover 26. FIG. 7 shows FIG. 4 and FIG. 1 together. In FIGS. 4 and 7, parts of the leaning vehicle 1 except the vehicle body frame 21, the left front wheel 31, the right front wheel 32, the rear wheel 4, and the leaning linkage mechanism 5 are not shown for description, and the outer shape of the vehicle body cover 26 is indicated by an alternate long and short dash line.

The left step 261 is located at the left of the main framework part 21a in plan view of the leaning vehicle 1. The right step 262 is located at the right of the main framework part 21a in plan view of the leaning vehicle 1. That is, the main framework part 21a is located between the left step 261 and the right step 262 in the left-right direction.

In FIGS. 2, 4, and 7, the left step 261 and the right step 262 are indicated by chain double-dashed lines and slashes, for description.

In this embodiment, the left step 261 and the right step 262 are integrally formed with the vehicle-body-cover-main body 26a. The left step and the right step may be separately provided from the vehicle-body-cover-main body 26a.

With the configuration described above, the left step 261 and the right step 262 are supported by the main framework part 21a with the vehicle-body-cover-main body 26a interposed therebetween. The main framework part 21a may be provided with step support parts individually supporting the left step and the right step. In this case, the left step and the right step are supported on the main framework part 21a by the step support parts.

As illustrated in FIGS. 4 and 7, a distance WS between the left end of the left step 261 and the right end of the right step 262 in the left-right direction is smaller than a track width WH between the left front wheel 31 and the right front wheel 32. That is, the track width WH between the left front wheel 31 and the right front wheel 32 is larger than the distance WS between the left end of the left step 261 and the right end of the right step 262. Accordingly, the distance from a grounding position of the feet of the driver before the driver rides on the leaning vehicle 1 to the seat surface 27c of the seat 27 in the left-right direction is small. As a result, the driver can easily get on or off the leaning vehicle 1.

The track width between the left front wheel 31 and the right front wheel 32 refers to a distance between the center of the left front wheel 31 and the center of the right front wheel 32 in the left-right direction of the leaning vehicle 1.

A left rear portion of the left step 261 has a recess 261a. The recess 261a enables the driver to easily get on or off the leaning vehicle 1. In addition, the driver can place the left foot on the ground while being seated on the seat surface 27c of the seat 27. As a result, convenience of the leaning vehicle 1 can be enhanced.

As illustrated in FIG. 2, a front portion of the vehicle-body-cover-main body 26a is provided with a front cover 265 covering the front of an unillustrated linkage-mechanism-driving motor for driving the leaning linkage mechanism 5 described later. The front cover 265 constitutes a front portion of a cabin C described later to cover a front portion of the linkage-mechanism-driving motor and cover a front portion of the driver seated on the seat surface 27c of the seat 27. The front cover 265 includes a light transmitting part 265a through which the driver seated on the seat surface 27c of the seat 27 can visually recognize the pair of left and right front wheels 3. The light transmitting part 265a is made of, for example, a transparent material. The light transmitting part 265a may be made of any material as long as the light transmitting part 265a is made of a light transmissive material that allows light to pass therethrough.

The front cover 265 is located further rearward than the pair of left and right front wheels 3. The left step 261 and the right step 262 are disposed rearward of the front cover 265. Accordingly, the front cover 265 prevents water splashed by the pair of left and right front wheels 3 from entering the passenger space as a space in which the driver rides.

The upper cover 26b and the front cover 265 of the vehicle-body-cover-main body 26a constitute the cabin C covering a front portion and an upper portion of the driver seated on the seat surface 27c of the seat 27. The cabin C may include a portion of the vehicle-body-cover-main body 26a covering a left portion of the driver, may include a portion of the vehicle-body-cover-main body 26a covering a right portion of the driver, and/or may include a portion of the vehicle-body-cover-main body 26a covering a rear portion of the driver.

(Leaning Linkage Mechanism)

A configuration of the leaning linkage mechanism 5 will now be described with reference to FIGS. 3, 5, and 6. FIG. 5 is a schematic view of the leaning linkage mechanism 5 with the vehicle body frame 21 leaning leftward, when the leaning linkage mechanism 5 is seen toward the rear. FIG. 6 is a schematic view of the leaning linkage mechanism 5 with the vehicle body frame 21 leaning rightward, when the leaning linkage mechanism 5 is seen toward the rear.

The leaning linkage mechanism 5 is a double wishbone-type linkage mechanism. The leaning linkage mechanism 5 is supported by the leaning-linkage-mechanism-support part 22. The leaning linkage mechanism 5 includes the left arm mechanism 51 and the right arm mechanism 52.

The left arm mechanism 51 is connected to a left portion of the leaning-linkage-mechanism-support part 22 and the left front wheel 31. As will be described later, the left arm mechanism 51 is rotatable upward or downward relative to each of the leaning-linkage-mechanism-support part 22 and the left front wheel 31. That is, the left arm mechanism 51 supports the left front wheel 31 with respect to the leaning-linkage-mechanism-support part 22 such that the left front wheel 31 is rotatable upward or downward.

The left arm mechanism 51 swings upward relative to the leaning-linkage-mechanism-support part 22 when the vehicle body frame 21 leans leftward, and swings downward relative to the leaning-linkage-mechanism-support part 22 when the vehicle body frame 21 leans rightward. The left arm mechanism 51 includes the left-upper-arm member 511, a left-lower-arm member 512, and a left knuckle 513. The left-upper-arm member 511 and the left-lower-arm member 512 are left swing arms.

The left-upper-arm member 511 is a flat-plate member and disposed between the leaning-linkage-mechanism-support part 22 and the left front wheel 31 to extend in the left-right direction. A right end portion of the left-upper-arm member 511 is connected to the leaning-linkage-mechanism-support part 22 to be rotatable upward or downward about the right end portion of the left-upper-arm member 511. A portion in which the right end portion of the left-upper-arm member 511 is rotatably connected to the leaning-linkage-mechanism-support part 22 is a support part 511a (i.e., the left support part) of the left-upper-arm member 511 to the leaning-linkage-mechanism-support part 22. A left end portion of the left-upper-arm member 511 is connected to the left knuckle 513 connected to the wheel member of the left front wheel 31 to be rotatable upward or downward about the left end portion of the left-upper-arm member 511.

The left-lower-arm member 512 is a flat-plate member and disposed under the left-upper-arm member 511 in parallel with the left-upper-arm member 511. That is, in a manner similar to the left-upper-arm member 511, the left-lower-arm member 512 is also disposed between the leaning-linkage-mechanism-support part 22 and the left front wheel 31 to extend in the left-right direction. A right end portion of the left-lower-arm member 512 is connected to the leaning-linkage-mechanism-support part 22 to be rotatable upward or downward about the right end portion of the left-lower-arm member 512. A portion in which the right end portion of the left-lower-arm member 512 is rotatably connected to the leaning-linkage-mechanism-support part 22 is a support part 512a of the left-lower-arm member 512 to the leaning-linkage-mechanism-support part 22. A left end portion of the left-lower-arm member 512 is connected to the left knuckle 513 connected to the wheel member of the left front wheel 31 to be rotatable upward or downward about the left end portion of the left-lower-arm member 512.

With the configuration of the left arm mechanism 51 described above, when the vehicle body frame 21 leans leftward, the left knuckle 513 leans leftward in parallel with the leaning-linkage-mechanism-support part 22. At this time, the left-upper-arm member 511 and the left-lower-arm member 512 are kept in the parallel state. On the other hand, when the vehicle body frame 21 leans rightward, the left knuckle 513 leans rightward in parallel with the leaning-linkage-mechanism-support part 22. At this time, the left-upper-arm member 511 and the left-lower-arm member 512 are kept in the parallel state.

The right arm mechanism 52 is connected to a right portion of the leaning-linkage-mechanism-support part 22 and the right front wheel 32. As will be described later, the right arm mechanism 52 is rotatable upward or downward relative to each of the leaning-linkage-mechanism-support part 22 and the right front wheel 32. That is, the right arm mechanism 52 supports the right front wheel 32 with respect to the leaning-linkage-mechanism-support part 22 such that the right front wheel 32 is rotatable upward or downward.

The right arm mechanism 52 swings downward relative to the leaning-linkage-mechanism-support part 22 when the vehicle body frame 21 leans leftward, and swings upward relative to the leaning-linkage-mechanism-support part 22 when the vehicle body frame 21 leans rightward. The right arm mechanism 52 includes the right-upper-arm member 521, a right-lower-arm member 522, and a right knuckle 523. The right-upper-arm member 521 and the right-lower-arm member 522 are right swing arms.

The right-upper-arm member 521 is a flat-plate member and disposed between the leaning-linkage-mechanism-support part 22 and the right front wheel 32 to extend in the left-right direction. A left end portion of the right-upper-arm member 521 is connected to the leaning-linkage-mechanism-support part 22 to be rotatable upward or downward about the left end portion of the right-upper-arm member 521. A portion in which the left end portion of the right-upper-arm member 521 is rotatably connected to the leaning-linkage-mechanism-support part 22 is a support part 521a (i.e., the right support part) of the right-upper-arm member 521 to the leaning-linkage-mechanism-support part 22. A right end portion of the right-upper-arm member 521 is connected to the right knuckle 523 connected to the wheel member of the right front wheel 32 to be rotatable upward or downward about the right end portion of the right-upper-arm member 521.

The right-lower-arm member 522 is a flat-plate member and disposed under the right-upper-arm member 521 in parallel with the right-upper-arm member 521. That is, in a manner similar to the right-upper-arm member 521, the right-lower-arm member 522 is also disposed between the leaning-linkage-mechanism-support part 22 and the right front wheel 32 to extend in the left-right direction. A left end portion of the right-lower-arm member 522 is connected to the leaning-linkage-mechanism-support part 22 to be rotatable upward or downward about the left end portion of the right-lower-arm member 522. A portion in which the left end portion of the right-lower-arm member 522 is rotatably connected to the leaning-linkage-mechanism-support part 22 is a support part 522a of the right-lower-arm member 522 to the leaning-linkage-mechanism-support part 22. A right end portion of the right-lower-arm member 522 is connected to the right knuckle 523 connected to the wheel member of the right front wheel 32 to be rotatable upward or downward about the right end portion of the right-lower-arm member 522.

With the configuration of the right arm mechanism 52 described above, when the vehicle body frame 21 leans leftward, the right knuckle 523 leans leftward in parallel with the leaning-linkage-mechanism-support part 22. At this time, the right-upper-arm member 521 and the right-lower-arm member 522 are kept in the parallel state. On the other hand, when the vehicle body frame 21 leans rightward, the right knuckle 523 leans rightward in parallel with the leaning-linkage-mechanism-support part 22. At this time, the right-upper-arm member 521 and the right-lower-arm member 522 are kept in the parallel state.

In this manner, with the leaning linkage mechanism 5 with the configuration described above, the vehicle body frame 21, the left front wheel 31, and the right front wheel 32 are allowed to lean leftward or rightward.

Although not specifically illustrated, the leaning linkage mechanism 5 described above may be configured such that leftward leaning and rightward leaning are controlled by the linkage-mechanism-driving motor. The linkage-mechanism-driving motor is disposed further rearward than the leaning-linkage-mechanism-support part 22 and rearward of the front cover 265, for example.

(Main Framework Part)

A configuration of the main framework part 21a will now be described in detail with reference to FIG. 3.

The main framework part 21a extends in the front-rear direction. That is, the width of the main framework part 21a in the left-right direction is smaller than the length of the main framework part 21a in the front-rear direction. The main framework part 21a includes the front framework part 211 and the rear framework part 212.

The front framework part 211 is located ahead of the rear framework part 212. The front framework part 211 extends in the front-rear direction. The front framework part 211 includes a pair of front-framework-side-wall portions 211a and a front-framework-bottom-wall portion 211b. The pair of front-framework-side-wall portions 211a is disposed side by side in the left-right direction and elongated in the front-rear direction. The front-framework-bottom-wall portion 211b connects lower end portions of the pair of front-framework-side-wall portions 211a. The pair of front-framework-side-wall portions 211a and the front-framework-bottom-wall portion 211b are connected to each other by, for example, welding. The pair of front-framework-side-wall portions 211a and the front-framework-bottom-wall portion 211b may be connected to each other by, for example, bonding or bolts, or may be integrally formed.

The height of the pair of front-framework-side-wall portions 211a is lower in rear portions than front portions. Accordingly, the front framework part 211 is allowed to be placed near the feet of a driver seated on the seat surface 27c of the seat 27. Thus, the main framework part 21a can be disposed in a lower portion of the leaning vehicle 1 so that the barycenter of the leaning vehicle 1 can be lowered.

In this embodiment, as illustrated in FIG. 4, a portion of the main framework part 21a located further forward than a center X in the front-rear direction of the left step 261 and the right step 262 is a main-framework-front portion 121. The main-framework-front portion 121 includes a part of the front framework part 211. The main-framework-front portion 121 linearly extends in the front-rear direction.

The main-framework-front portion 121 is configured such that a dimension WF thereof in the vehicle width direction is larger than a distance D between the support part 511a of the left upper arm 511 to the leaning-linkage-mechanism-support part 22 and the support part 521a of the right upper arm 521 to the leaning-linkage-mechanism-support part 22 (see FIGS. 5 and 6). The main-framework-front portion 121 is configured such that the dimension WF thereof in the vehicle width direction is larger than a distance D between the support part 512a of the left lower arm 512 to the leaning-linkage-mechanism-support part 22 and the support part 522a of the right lower arm 522 to the leaning-linkage-mechanism-support part 22 (see FIGS. 5 and 6).

As illustrated in FIG. 1, the upper end of the main-framework-front portion 121 is lower than the lower end of the steering handle SH. Specifically, a height H2 of the upper end of the main-framework-front portion 121 is smaller than a height H1 of the lower end of the steering handle SH. Accordingly, flexibility in, for example, a riding position of a driver and layout of parts mounted on the vehicle body frame can be enhanced. Thus, the degree of design flexibility of the leaning vehicle can be increased.

The lower end of the steering handle SH is located at the lowest position in the bar handle 61 and the steering shaft 62. In this embodiment, the lower end of the steering handle SH is the lower end of the steering shaft 62.

The upper end of the main-framework-front portion 121 is located at the highest position in the main-framework-front portion 121. In this embodiment, the upper end of the main-framework-front portion 121 is a front portion of the front framework part 211.

The upper end of the main-framework-front portion 121 is lower than the seat surface 27c of the seat 27. Specifically, the height H2 of the upper end of the main-framework-front portion 121 is smaller than a height H3 of the seat surface 27c of the seat 27. Accordingly, flexibility in, for example, a riding position of a driver and layout of parts mounted on the vehicle body frame can be enhanced. Thus, the degree of design flexibility of the leaning vehicle can be increased. The height H3 of the seat surface 27c of the seat described above is the height of a lowest portion in the seat surface 27c.

The upper end of the main-framework-front portion 121 is lower than the upper end of the leaning linkage mechanism 5. That is, as illustrated in FIG. 2, the height H2 of the upper end of the main-framework-front portion 121 is smaller than a height H4 of the leaning linkage mechanism 5. Accordingly, flexibility in, for example, a riding position of a driver and layout of parts mounted on the vehicle body frame can be enhanced. Thus, the degree of design flexibility of the leaning vehicle can be increased. The upper end of the leaning linkage mechanism 5 is located at the highest position in the leaning linkage mechanism 5.

The height as used in this embodiment refers to a height from the road surface on which the leaning vehicle 1 is traveling.

As illustrated in FIG. 3, a plate-shaped reinforcing member 213 is disposed on upper portions of center portions in the front-rear direction of the pair of front-framework-side-wall portions 211a. The reinforcing member 213 is connected to the center portions in the front-rear direction of the pair of front-framework-side-wall portions 211a to bridge the center portions in the left-right direction. The reinforcing member 213 may not be provided. The reinforcing member 213 may have other shapes such as a rod shape.

The rear framework part 212 is located rearward of the front framework part 211. The rear framework part 212 extends in the front-rear direction. The rear framework part 212 includes a pair of rear-framework-side-wall-portions 212a and a plurality of rear-framework-beam portions 212b.

The pair of rear-framework-side-wall-portions 212a is disposed side by side in the left-right direction and elongated in the front-rear direction. The plurality of rear-framework-beam portions 212b connect the pair of rear-framework-side-wall-portions 212a in the left-right direction.

The dimension of the rear framework part 212 in the top-bottom direction is larger than the dimension of the front framework part 211 in the top-bottom direction. The dimension of the rear framework part 212 in the left-right direction is smaller than the dimension of the front framework part 211 in the left-right direction.

The rear framework part 212 supports the power unit 8. The upper portion of the rear framework part 212 supports the seat 27. The rear end portion of the rear framework part 212 supports the rear-arm-support part 24.

Each of the rear-framework-side-wall-portions 212a of the rear framework part 212 has an opening 212c. Each rear-framework-side-wall-portion 212a may not include an opening.

The front framework part 211 and the rear framework part 212 are aligned in the front-rear direction and connected to each other. Accordingly, the vehicle body frame 21 is elongated in the front-rear direction as described above.

In this embodiment, a portion of the main framework part 21a located further rearward than the center X in the front-rear direction of the left step 261 and the right step 262 is a main-framework-rear portion 122. The main-framework-rear portion 122 includes a rear portion of the front framework part 211 and the rear framework part 212.

As illustrated in FIG. 4, the main framework part 21a is located between the left step 261 and the right step 262 provided in the vehicle-body-cover-main body 26a in plan view. The main framework part 21a linearly extends in the front-rear direction between the legs of the driver whose feet are placed on the left step 261 and the right step 262 in a state where the driver is seated on the seat 27. In the main framework part 21a, the main-framework-front portion 121 located further forward than the center X in the front-rear direction of the left step 261 and the right step 262 supports the leaning linkage mechanism 5, and the main-framework-rear portion 122 located further rearward than the center X in the front-rear direction of the left step 261 and the right step 262 supports the seat 27, the rear wheel 4, and the power unit 8. As illustrated in FIG. 2, the main-framework-front portion 121 supports at least a part of the leaning linkage mechanism 5 at a position further downward than the upper surface of at least a part of the left step 261 and the right step 262 in a side view of the leaning vehicle 1.

In the configuration described above, the main framework part 21a is of a shape having a small width and extending linearly. In the main framework part 21a, the main-framework-front portion 121 supports the leaning linkage mechanism 5 supporting the vehicle body frame 21, the left front wheel 31, and the right front wheel 32 such that the vehicle body frame 21, the left front wheel 31, and the right front wheel 32 lean leftward or rightward, and the main-framework-rear portion 122 supports the other mounted parts. Accordingly, flexibility in, for example, a riding position of a driver and layout of parts mounted on the vehicle body frame 21 can be enhanced. Thus, the degree of design flexibility of the leaning vehicle 1 can be increased.

As illustrated in FIG. 1, the main framework part 21a of this embodiment extends linearly in the front-rear direction at a position further downward than the upper surface of at least a part of the left step 261 and the right step 262 on which the driver seated on the seat surface 27c of the seat 27 places the feet, in a side view of the leaning vehicle 1. Accordingly, flexibility in, for example, a riding position of a driver and layout of parts mounted on the vehicle body frame 21 can be enhanced. Thus, the degree of design flexibility of the leaning vehicle 1 can be increased.

In addition, as described above, since the main framework part 21a of the vehicle body frame 21 is disposed at a low position in the leaning vehicle 1, the driver can easily get on or off the leaning vehicle 1 even in the case of the leaning vehicle 1 of this embodiment with the upper cover 26b.

Furthermore, since the main-framework-front portion 121 is configured such that the dimension WF thereof in the vehicle width direction is larger than the distance D between the support part 511a of the left-upper-arm member 511 to the vehicle body frame 21 and the support part 521a of the right-upper-arm member 521 to the vehicle body frame 21 as in this embodiment, rigidity of the main-framework-front portion 121 can be enhanced, as compared to a portion of the vehicle body frame 21 supporting the left-upper-arm member 511 and the right-upper-arm member 521. Accordingly, it is possible to reduce deformation of the main-framework-front portion 121 caused by a force input from the left front wheel 31 through the left-upper-arm member 511 and a force input from the right front wheel 32 though the right-upper-arm member 521. Thus, the configuration described above can increase rigidity of the entire vehicle body frame 21.

Similarly, since the main-framework-front portion 121 is configured such that the dimension WF thereof in the vehicle width direction is larger than the distance D between the support part 512a of the left-lower-arm member 512 to the vehicle body frame 21 and the support part 522a of the right-lower-arm member 522 to the vehicle body frame 21, rigidity of the main-framework-front portion 121 can be increased, as compared to a portion of the vehicle body frame 21 supporting the left-lower-arm member 512 and the right-lower-arm member 522. Thus, it is possible to reduce deformation of the main-framework-front portion 121 caused by a force input from the left front wheel 31 through the left-lower-arm member 512 and a force input from the right front wheel 32 through the right-lower-arm member 522. Thus, the configuration described above can increase rigidity of the entire vehicle body frame 21.

Second Embodiment

Figure 8:
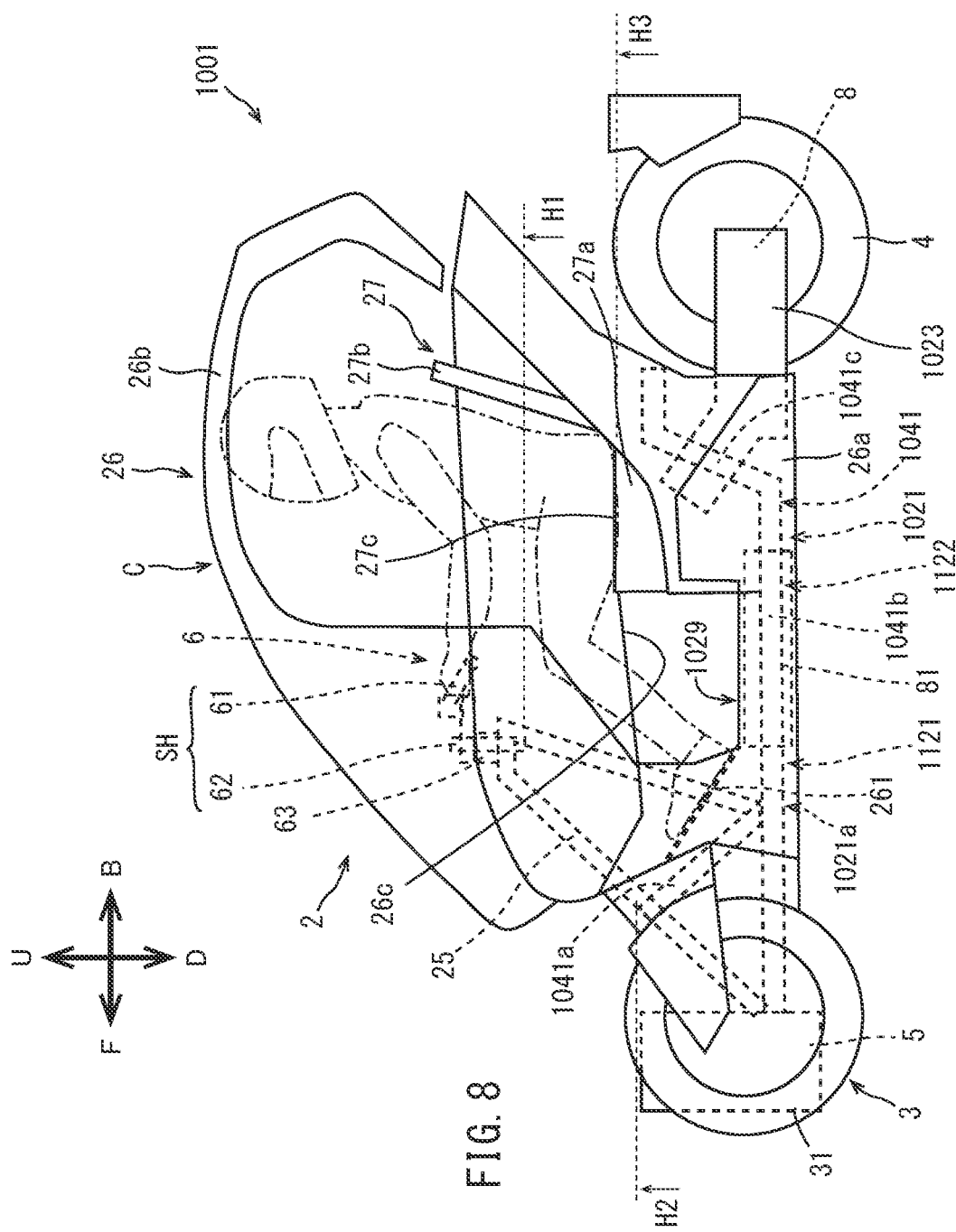
FIG. 8 is a left side view schematically illustrating an overall configuration of a leaning vehicle according to a second embodiment.
Figure 9:
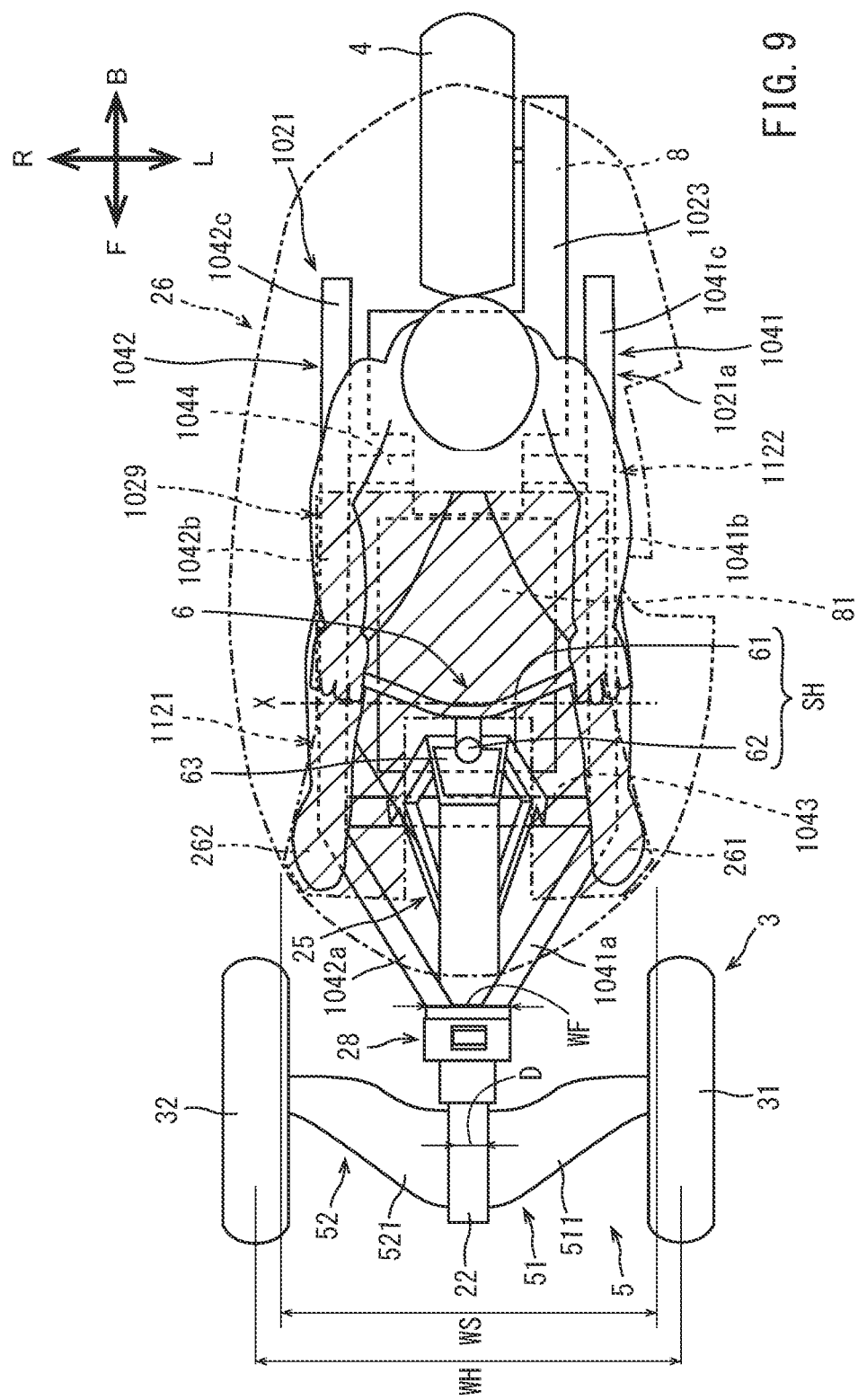
FIG. 9 is a plan view illustrating a schematic configuration of a vehicle body frame of the leaning vehicle according to the second embodiment.

FIG. 8 is a left side view illustrating a schematic configuration of a leaning vehicle 1001 according to a second embodiment. FIG. 9 is a plan view illustrating a schematic configuration of a vehicle body frame 1021 of the leaning vehicle 1001. In FIG. 9, a floor 1029 including a left step 261 and a right step 262 and described later is indicated by chain double-dashed lines and slashes.

In this embodiment, a configuration of the vehicle body frame 1021 is different from a configuration of the vehicle body frame 21 of the leaning vehicle 1 according to the first embodiment. In the following description, components similar to those of the first embodiment are denoted by the same reference characters and will not be described again, and only components different from those of the first embodiment will be described.

As illustrated in FIG. 9, the vehicle body frame 1021 includes a main framework part 1021a, a leaning-linkage-mechanism-support part 22, and a handlebar support part 25.

The main framework part 1021a includes a pipe-shaped left main frame 1041 and a pipe-shaped right main frame 1042 extending in the front-rear direction below the left step 261 and the right step 262. The left main frame 1041 is located in a left portion of the leaning vehicle 1001 in plan view. The right main frame 1042 is located in a right portion of the leaning vehicle 1001 in plan view. In this embodiment, the left main frame 1041 and the right main frame 1042 are disposed symmetrically with respect to the center of the leaning vehicle 1001 in the left-right direction in plan view.

In this embodiment, the left step 261 and the right step 262 are constituted by the plate-shaped floor 1029 located on the left main frame 1041 and the right main frame 1042. A front portion of the floor 1029 is inclined forward and upward. A rear portion of the floor 1029 is flat. That is, in this embodiment, the left step 261 and the right step 262 are integrally formed. The upper surfaces of the left step 261 and the right step 262 are the upper surface of the floor 1029.

As illustrated in FIGS. 8 and 9, the left main frame 1041 includes a left-main-frame-front portion 1041*a*, a left-main-frame-rear portion 1041*c*, and a left-main-frame-intermediate portion 1041*b*. The left-main-frame-front portion 1041*a*, the left-main-frame-intermediate portion 1041*b*, and the left-main-frame-rear portion 1041*c* are aligned in the front-rear direction and coupled to one another.

The left-main-frame-intermediate portion 1041*b* extends in the front-rear direction below the left step 261. The left-main-frame-intermediate portion 1041*b* supports a seat 27.

The left-main-frame-front portion 1041*a* extends forward and obliquely upward from a front portion of the left-main-frame-intermediate portion 1041*b*. The left-main-frame-front portion 1041*a* is formed such that the front end portion of the left-main-frame-front portion 1041*a* approaches the front end portion of a right-main-frame-front portion 1042*a* described later, that is, the front end portion of the left-main-frame-front portion 1041*a* approaches the center of the leaning vehicle 1001 in the left-right direction in plan view. The front end portion of the left-main-frame-front portion 1041*a* is connected to the leaning-linkage-mechanism-support part 22 through a buffer-device-support part 28. The left-main-frame-front portion 1041*a* and the right-main-frame-front portion 1042*a* described later support the handlebar support part 25.

The left-main-frame-rear portion 1041*c* has a shape extending upward from the rear end of the left-main-frame-intermediate portion 1041*b* and bent rearward. The left-main-frame-rear portion 1041*c* is integrated with the left-main-frame-intermediate portion 1041*b*.

The right main frame 1042 includes the right-main-frame-front portion 1042*a*, a right-main-frame-rear portion 1042*c*, and a right-main-frame-intermediate portion 1042*b*. The right-main-frame-front portion 1042*a*, the right-main-frame-intermediate portion 1042*b*, and the right-main-frame-rear portion 1042*c* are aligned in the front-rear direction and coupled to one another.

The right-main-frame-intermediate portion 1042*b* extends in the front-rear direction below the right step 262. The right-main-frame-intermediate portion 1042*b* supports the seat 27.

The right-main-frame-front portion 1042*a* extends forward and obliquely upward from a front portion of the right-main-frame-intermediate portion 1042*b*. The right-main-frame-front portion 1042*a* is formed such that the front end portion of the right-main-frame-front portion 1042*a* approaches the front end portion of the left-main-frame-front portion 1041*a*, that is, the front end portion of the right-main-frame-front portion 1042*a* approaches the center of the leaning vehicle 1001 in the left-right direction in plan view. The front end portion of the right-main-frame-front portion 1042*a* is connected to the leaning-linkage-mechanism-support part 22 through the buffer-device-support part 28. The right-main-frame-front portion 1042*a* and the left-main-frame-front portion 1041*a* support the handlebar support part 25.

The right-main-frame-rear portion 1042*c* has a shape extending upward from the right-main-frame-intermediate portion 1042*b* and bent rearward. The right-main-frame-rear portion 1042*c* is integrated with the right-main-frame-intermediate portion 1042*b*.

The left-main-frame-intermediate portion 1041*b* and the right-main-frame-intermediate portion 1042*b* are coupled to each other by a front coupling part 1043 extending in the left-right direction. The left-main-frame-rear portion 1041*c* and the right-main-frame-rear portion 1042*c* are coupled to each other by a rear coupling part 1044 located further rearward than the front coupling part 1043 and extending in the left-right direction. Accordingly, rigidity of the main framework part 1021*a* can be increased.

The rear coupling part 1044 supports a front portion of a swing arm 1023 to be rotatable upward or downward. The swing arm 1023 rotatably supports a rear wheel 4, instead of the rear arm of the first embodiment. The swing arm 1023 is provided with a power unit 8.

A battery 81 for supplying electric power to the power unit 8 is disposed between the left-main-frame-intermediate portion 1041*b* and the right-main-frame-intermediate portion 1042*b*. In a case where a driving source of the leaning vehicle 1001 includes an engine, a fuel tank is disposed between the left-main-frame-intermediate portion 1041*b* and the right-main-frame-intermediate portion 1042*b*.

As described above, the main framework part 1021*a* extends linearly in the front-rear direction at a position further downward than the upper surfaces of the left step 261 and the right step 262. Accordingly, the barycenter of the leaning vehicle 1001 can be lowered, and a driver can easily get on or off the leaning vehicle 1001.

With this configuration described above, the main framework part 1021*a* is configured to extend linearly in the front-rear direction at a position further downward than the upper surfaces of the left step 261 and the right step 262 on which the driver seated on a seat surface 27*c* of the seat 27 places the feet in a side view of the leaning vehicle 1001. Thus, flexibility in, for example, the riding position of the driver and layout of mounted parts mounted on the vehicle body frame 1021 can be enhanced. Accordingly, the degree of design flexibility of the leaning vehicle 1001 can be increased.

A portion of the main framework part 1021*a* located further forward than the center X in the front-rear direction of the left step 261 and the right step 262 is a main-framework-front portion 1121. The main-framework-front portion 1121 includes the left-main-frame-front portion 1041*a*, the right-main-frame-front portion 1042*a*, a front portion of the left-main-frame-intermediate portion 1041*b*, and a front portion of the right-main-frame-intermediate portion 1042*b*. A portion of the main framework part 1021*a* located further rearward than the center X in the front-rear direction of the left step 261 and the right step 262 is a main-framework-rear portion 1122. The main-framework-rear portion 1122 includes a rear portion of the left-main-frame-intermediate portion 1041*b*, a rear portion of the right-main-frame-intermediate portion 1042*b*, the left-main-frame-rear portion 1041*c*, and the right-main-frame-rear portion 1042*c*. In the main framework part 1021*a*, the main-framework-front portion 1121 supports a leaning linkage mechanism 5, and the main-framework-rear portion 1122 supports the seat 27, the rear wheel 4, and the power unit 8.

With the configuration described above, in the main framework part 1021a of the vehicle body frame 1021, the main-framework-front portion 1121 supports the leaning linkage mechanism 5 supporting the vehicle body frame 1021, a left front wheel 31, and a right front wheel 32 such that the vehicle body frame 1021, the left front wheel 31, and the right front wheel 32 lean leftward or rightward, and the main-framework-rear portion 1122 supports the other mounted parts. Accordingly, flexibility in, for example, a riding position of a driver and layout of parts mounted on the vehicle body frame 1021 can be enhanced. Thus, the degree of design flexibility of the leaning vehicle 1001 can be increased.

As illustrated in FIG. 8, the upper end of the main-framework-front portion 1121 is lower than the lower end of the steering handle SH. Specifically, a height H2 of the upper end of the main-framework-front portion 1121 is smaller than a height H1 of the lower end of the steering handle SH. Accordingly, flexibility in, for example, a riding position of a driver and layout of parts mounted on the vehicle body frame 1021 can be enhanced. Thus, the degree of design flexibility of the leaning vehicle 1001 can be increased.

The lower end of the steering handle SH is located at the lowest position in the bar handle 61 and the steering shaft 62. In this embodiment, the lower end of the steering handle SH is the lower end of the steering shaft 62.

The upper end of the main-framework-front portion 1121 is located at the highest position in the main-framework-front portion 1121. In this embodiment, the upper end of the main-framework-front portion 1121 is the front ends of the left-main-frame-front portion 1041a and the right-main-frame-front portion 1042a.

The upper end of the main-framework-front portion 1121 is lower than the seat surface 27c of the seat 27. Specifically, the height H2 of the upper end of the main-framework-front portion 1121 is smaller than a height H3 of the seat surface 27c of the seat 27. Accordingly, flexibility in, for example, a riding position of a driver and layout of parts mounted on the vehicle body frame 1021 can be enhanced. Thus, the degree of design flexibility of the leaning vehicle 1001 can be increased. The height H3 of the seat surface 27c of the seat described above is the height of a lowest portion in the seat surface 27c.

The height as used in this embodiment refers to a height from the road surface on which the leaning vehicle 1001 is traveling.

In this embodiment, as illustrated in FIG. 9, a distance WS between the left end of the left step 261 and the right end of the right step 262 in the left-right direction is also smaller than a track width WH between the left front wheel 31 and the right front wheel 32. That is, the track width WH between the left front wheel 31 and the right front wheel 32 is larger than the distance WS between the left end of the left step 261 and the right end of the right step 262. Accordingly, the distance from a grounding position of the feet of the driver before the driver rides on the leaning vehicle 1001 to the seat surface 27c of the seat 27 in the left-right direction is small. As a result, the driver can easily get on or off the leaning vehicle 1001.

The track width between the left front wheel 31 and the right front wheel 32 refers to a distance between the center of the left front wheel 31 and the center of the right front wheel 32 in the left-right direction of the leaning vehicle 1001.

In this embodiment, as illustrated in FIG. 8, the main-framework-front portion 1121 also supports at least a part of the leaning linkage mechanism 5 at a position further downward than the upper surface of at least a part of the left step 261 and the right step 262, in a side view of the leaning vehicle 1001.

Furthermore, in this embodiment, as illustrated in FIG. 9, the main-framework-front portion 1121 is also configured such that the dimension WF thereof in the vehicle width direction is larger than the distance D between the support part 511a of the left-upper-arm member 511 to the vehicle body frame 1021 and the support part 521a of the right-upper-arm member 521 to the vehicle body frame 1021. In addition, the main-framework-front portion 1121 is configured such that the dimension WF thereof in the vehicle width direction is larger than the distance D between the support part 512a of the left-lower-arm member 512 to the vehicle body frame 1021 and the support part 522a of the right-lower-arm member 522 to the vehicle body frame 1021. In this embodiment, the dimension WF of the main-framework-front portion 1121 in the vehicle width direction is a dimension of a front end portion of the main-framework-front portion 1121 in the vehicle width direction.

Other Embodiments

The embodiments of the present teaching have been described above, but the embodiments are merely examples for carrying out the present teaching. Thus, the present teaching is not limited to the embodiments described above, and the embodiments may be modified as necessary within a range not departing from the gist of the present teaching.

In the first embodiment, the handlebar support part 25 is provided separately from the front framework part 211. Alternatively, the handlebar support part may be integrally provided with the front framework part. That is, the handlebar support part may be integrally provided with the main framework part.

In the first embodiment, the main framework part 21a includes the front framework part 211 and the rear framework part 212. Alternatively, the main framework part may include at least a part of a casing of the power unit, in addition to the front framework part and the rear framework part.

In each embodiment, the leaning linkage mechanism 5 is a double wishbone-type linkage mechanism including the left upper arm 511, the right upper arm 521, the left lower arm 512, and the right lower arm 522. Alternatively, the leaning linkage mechanism may include only one of the upper arm and the lower arm.

In the first embodiment, the main framework part 21a includes the front framework part 211 and the rear framework part 212. Alternatively, the main framework part may be one unit, or may be constituted by coupling three or more members in the front-rear direction. The main framework part may be constituted by coupling a plurality of parts in the left-right direction. The main framework part may be constituted by using pipe members.

In the first embodiment, a rear portion of the front framework part 211 is lower than a front portion of the front framework part 211. Alternatively, the front framework part may have a uniform height in the front-rear direction, or may have a front portion lower than a rear portion thereof.

In the first embodiment, the dimension of the rear framework part 212 in the left-right direction is smaller than the dimension of the front framework part 211 in the left-right direction, and the height of the rear framework part 212 is larger than the height of the front framework part 211. Alternatively, the dimension of the rear framework part in the left-right direction may be equal to or larger than the dimension of the front framework part in the left-right direction. The height of the rear framework part may be equal to or smaller than the height of the front framework part.

In the first embodiment, in the leaning-linkage-mechanism-support part 22, the support part 511a of the left upper arm 511 and the support part 521a of the right upper arm 521 are located away from each other. In the leaning-linkage-mechanism-support part 22, the support part 512a of the left lower arm 512 and the support part 522a of the right lower arm 522 are located away from each other. Alternatively, in the leaning-linkage-mechanism-support part, the support part of the left upper arm and the support part of the right upper arm may be located at the same position. In the leaning-linkage-mechanism-support part, the support part of the left lower arm and the support part of the right lower arm may be located at the same position.

In each embodiment, the upper end of the main-framework-front portion 121, 1121 is lower than the lower end of the steering handle SH. Alternatively, the upper end of the main-framework-front portion may be equal to or higher than the lower end of the steering handle.

In each embodiment, the upper end of the main-framework-front portion 121, 1121 is lower than the seat surface 27c of the seat 27. Alternatively, the upper end of the main-framework-front portion may be equal to or higher than the seat surface of the seat.

In the first embodiment, the upper end of the main-framework-front portion 121 is lower than the upper end of the leaning linkage mechanism 5. Alternatively, the upper end of the main-framework-front portion may be equal to or higher than the upper end of the leaning linkage mechanism.

In each embodiment, the track width WH between the left front wheel 31 and the right front wheel 32 is larger than the distance WS between the left end of the left step 261 and the right end of the right step 262 in the left-right direction. Alternatively, the track width between the left front wheel and the right front wheel may be equal to or smaller than the distance between the left end of the left step and the right end of the right step in the left-right direction.

In each embodiment, the handlebar support part 25 is formed in a tower shape by plate-shaped bar members. Alternatively, the handlebar support part may be constituted by pipe members or plate-shaped members as long as the handlebar support part can rotatably support the steering handle.

In the second embodiment, the power unit 8 is provided on the swing arm 1023. Alternatively, the power unit may be provided on the rear wheel. In this case, a wheel-in motor, for example, may be provided in the rear wheel.

In the second embodiment, the main framework part 2021a of the vehicle body frame 1021 of the leaning vehicle 1001 includes the pipe-shaped left main frame 1041 and the pipe-shaped right main frame 1042 extending in the front-rear direction below the left step 261 and the right step 262. Alternatively, each of the left main frame and the right main frame may be constituted by a member obtained by bending a flat plate in a U shape. The main framework part may include a frame except the left main frame and the right main frame. The configuration of the main framework part is not limited to the configuration of the second embodiment.

In each embodiment, the seat 27 includes the seat portion 27a and the seat back 27b. Alternatively, the seat may be a so-called straddled type seat including only a seat portion.

In each embodiment, the three-wheeled vehicle has been described as an example of the leaning vehicle, but the leaning vehicle may be a four-wheeled vehicle or a vehicle other than the three-wheeled vehicle.

REFERENCE SIGNS LIST

1, 1001 leaning vehicle
2 vehicle main body
3 front wheel
4 rear wheel
5 leaning linkage mechanism
6 steering mechanism
7 buffer device
8 power unit (driving source)
8a driving-force-transfer part
81 battery
21, 1021 vehicle body frame
21a, 1021a main framework part
211 front framework part
211a front-framework-side-wall portion
211b front-framework-bottom-wall portion
212 rear framework part
212a rear-framework-side-wall-portion
212b rear-framework-beam portion
212c opening
213 reinforcing member
22 leaning-linkage-mechanism-support part
23 rear arm
24 rear-arm-support part
25 handlebar support part
25a handle-support-leg part
25b handle-support-beam part
25c handle-support-top-panel part
26 vehicle body cover (cover)
26a vehicle-body-cover-main body
26b upper cover
26c opening
261 left step
261a recess
262 right step
265 front cover
265a light transmitting part
27 seat
27a seat portion
27b seat back
27c seat surface
28 buffer-device-support part
28a buffer-device-support-main-body portion
28b tower portion
31 left front wheel
32 right front wheel
51 left arm mechanism
511 left-upper-arm member
511a support part
512 left-lower-arm member
512a support part
513 left knuckle
52 right arm mechanism
521 right-upper-arm member
521a support part
522 right-lower-arm member
522a support part
523 right knuckle
61 bar handle
62 steering shaft
63 steering-shaft-support part 71 left buffer device
72 right buffer device
121, 1121 main-framework-front portion
122, 1122 main-framework-rear portion
1023 swing arm
1029 floor
1041 left main frame
1041a left-main-frame-front portion
1041b left-main-frame-intermediate portion
1041c left-main-frame-rear portion
1042 right main frame
1042a right-main-frame-front portion
1042b right-main-frame-intermediate portion
1042c right-main-frame-rear portion
1043 front coupling part
1044 rear coupling part
SH steering handle
C cabin
P steering axis
X center in front-rear direction

The invention claimed is:

1. A leaning vehicle comprising:
a vehicle body frame including a main framework part;
a seat supported by the vehicle body frame and being configured for a driver of the leaning vehicle to be seated thereon;
a left step and a right step supported by the vehicle body frame, and each having an upper surface for a foot of the driver to be placed thereon;
a left front wheel located at a left side of the vehicle body frame;
a right front wheel located at a right side of the vehicle body frame;
at least one rear wheel;
a leaning linkage mechanism configured to support the vehicle body frame, the left front wheel, and the right front wheel, such that the vehicle body frame, the left front wheel, and the right front wheel are leanable leftward or rightward, the leaning linkage mechanism including
  a left swing arm swingably supporting the left front wheel, the left swing arm being connected to the vehicle body frame via a left support part, and
  a right swing arm swingably supporting the right front wheel, the right swing arm being connected to the vehicle body frame via a right support part; and
a buffer device configured to buffer movement of the left front wheel and the right front wheel, wherein
the leaning vehicle leans the vehicle body frame, the left front wheel, the right front wheel, and the at least one rear wheel leftward and rightward when turning left and right, respectively;
the main framework part includes a main-framework-front portion that
  is located further forward than a center of the left step and a center of the right step in a front-rear direction of the leaning vehicle, and extends linearly in the front-rear direction,
  has a dimension, in a width direction of the leaning vehicle, larger than a distance between the left support part and the right support part;
the vehicle body frame supports entire parts of the left support part and the right support part of the leaning linkage mechanism at a position further downward than at least a part of the upper surface of the left step and of the upper surface of the right step in a top-bottom direction with respect to the leaning vehicle; and
the entire main-framework-front portion is located further downward than at least the part of the upper surface of the left step and the part of the upper surface of the right step.

2. The leaning vehicle according to claim 1, wherein the main framework part is located between the left step and the right step in a plan view of the leaning vehicle.

3. The leaning vehicle according to claim 2, wherein the main framework part extends linearly in the front-rear direction, such that the main framework part is between legs of the driver in a state where the driver is seated on the seat and the feet of the driver are placed on the left step and the right step.

4. The leaning vehicle according to claim 1, wherein the main framework part extends linearly in the front-rear direction and is located further downward than the upper surfaces of the left step and the right step in the top-bottom direction with respect to the leaning vehicle.

5. The leaning vehicle according to claim 1, further comprising a driving source, wherein
the main framework part further includes a main-framework-rear portion that is located further rearward than the center of the left step and the center of the right step in the front-rear direction and supports the seat, the at least one rear wheel, and the driving source.

6. The leaning vehicle according to claim 1, further comprising a steering handle configured to rotate about a steering axis by operation of the driver, wherein
the vehicle body frame further includes a handlebar support part rotatably supporting the steering handle, and
the handlebar support part is different from the main framework part, and extends upward from an upper portion of the main framework part.

7. The leaning vehicle according to claim 6, wherein at least a part of the handlebar support part extends upward from an upper portion of the main-framework-front portion.

8. The leaning vehicle according to claim 6, wherein an upper end of the main-framework-front portion is lower than a lower end of the steering handle.

9. The leaning vehicle according to claim 6, wherein an upper end of the handlebar support part is higher than a seat surface of the seat.

10. The leaning vehicle according to claim 1, wherein the leaning linkage mechanism is configured to be detachable from the main framework part and the handlebar support part.

11. The leaning vehicle according to claim 1, wherein an upper end of the main-framework-front portion is lower than a seat surface of the seat.

12. The leaning vehicle according to claim 1, wherein an upper end of the main-framework-front portion is lower than an upper end of the leaning linkage mechanism.

13. The leaning vehicle according to claim 1, wherein a track width between the left front wheel and the right front wheel is larger than a distance between a left end of the left step and a right end of the right step.

* * * * *